US008793738B2

(12) United States Patent
Klosterman et al.

(10) Patent No.: US 8,793,738 B2
(45) Date of Patent: Jul. 29, 2014

(54) TELEVISION SYSTEM WITH DOWNLOADABLE FEATURES

(75) Inventors: Brian Lee Klosterman, San Ramon, CA (US); Kenneth Alan Milnes, Fremont, CA (US)

(73) Assignee: Starsight Telecast Incorporated, Santa Clara, CA (US)

( * ) Notice: Subject to any disclaimer, the term of this patent is extended or adjusted under 35 U.S.C. 154(b) by 1760 days.

(21) Appl. No.: 10/335,992

(22) Filed: Jan. 2, 2003

(65) Prior Publication Data

US 2003/0167473 A1    Sep. 4, 2003

Related U.S. Application Data

(63) Continuation of application No. 09/018,279, filed on Feb. 4, 1998, now abandoned, which is a continuation of application No. 08/482,268, filed on Jun. 7, 1995, now abandoned, which is a continuation-in-part of application No. 08/243,598, filed on May 13, 1994, now Pat. No. 5,619,274, which is a continuation-in-part of application No. 08/239,225, filed on May 4, 1994, now Pat. No. 5,790,198.

(51) Int. Cl.
*H04N 7/173* (2011.01)
*H04N 7/16* (2011.01)
*H04N 5/46* (2006.01)
*G06F 3/00* (2006.01)

(52) U.S. Cl.
USPC ............................ 725/50; 725/132; 725/140

(58) Field of Classification Search
CPC .................................................. H04N 5/44543

USPC ............ 725/132, 140, 152, 60, 37–40, 47, 50
See application file for complete search history.

(56) References Cited

U.S. PATENT DOCUMENTS

| 3,278,677 A | 10/1966 | Fannoy |
| 3,440,427 A | 4/1969 | Kammer |
| 3,492,577 A | 1/1970 | Reiter et al. |
| 3,493,674 A | 2/1970 | Houghton |

(Continued)

FOREIGN PATENT DOCUMENTS

| AU | 731010 | 7/1998 |
| AU | 733993 | 2/1999 |

(Continued)

OTHER PUBLICATIONS

U.S. Appl. No. 09/330,792, filed Jun. 11, 1999, Knudson et al.

(Continued)

*Primary Examiner* — Pankaj Kumar
*Assistant Examiner* — Reuben M Brown
(74) *Attorney, Agent, or Firm* — Ropes & Gray LLP

(57) ABSTRACT

The present invention is directed to providing downloadable features, and more particularly to providing these features to identified receiving locations (50) in a television system (10). Features may be desired by the manufacturer for correcting software defects, updating software, or meeting compatibility requirements. Features may also be ordered by consumers who respond to solicitation advertisements (130) for those features. The data related to the features is compiled and sent from a main location (20) to multiple receiving locations (46, 48 and 50). The data is then stored in a memory (58) in the identified receiving locations (50), and software is used to install or operate the stored feature.

19 Claims, 3 Drawing Sheets

(56) References Cited

U.S. PATENT DOCUMENTS

| | | |
|---|---|---|
| 3,729,581 A | 4/1973 | Anderson |
| 3,833,757 A | 9/1974 | Kirk, Jr. et al. |
| 3,848,193 A | 11/1974 | Martin et al. |
| 3,891,792 A | 6/1975 | Kimura |
| 3,936,868 A | 2/1976 | Thorpe |
| 3,987,398 A | 10/1976 | Fung |
| 3,996,583 A | 12/1976 | Hutt et al. |
| 4,004,085 A | 1/1977 | Makino et al. |
| 4,016,361 A | 4/1977 | Pandey |
| 4,024,401 A | 5/1977 | Bernstein et al. |
| 4,026,555 A | 5/1977 | Kirschner et al. |
| 4,031,548 A | 6/1977 | Kato et al. |
| 4,052,719 A | 10/1977 | Hutt et al. |
| 4,058,830 A | 11/1977 | Guinet et al. |
| 4,079,419 A | 3/1978 | Siegle et al. |
| 4,081,753 A | 3/1978 | Miller |
| 4,081,754 A | 3/1978 | Jackson |
| 4,096,524 A | 6/1978 | Scott |
| 4,134,127 A | 1/1979 | Campioni |
| 4,139,860 A | 2/1979 | Micic et al. |
| 4,150,254 A | 4/1979 | Schussler et al. |
| 4,156,850 A | 5/1979 | Beyers, Jr. |
| 4,161,728 A | 7/1979 | Insam |
| 4,162,513 A | 7/1979 | Beyers, Jr. et al. |
| 4,170,782 A | 10/1979 | Miller |
| 4,186,413 A | 1/1980 | Mortimer |
| 4,203,130 A | 5/1980 | Doumit et al. |
| 4,205,343 A | 5/1980 | Barrett |
| 4,218,698 A | 8/1980 | Bart et al. |
| 4,228,543 A | 10/1980 | Jackson |
| 4,231,031 A | 10/1980 | Crowther et al. |
| 4,233,628 A | 11/1980 | Ciciora |
| 4,249,211 A | 2/1981 | Baba et al. |
| 4,249,213 A | 2/1981 | Imaide et al. |
| 4,261,006 A | 4/1981 | Weintraub et al. |
| 4,264,924 A | 4/1981 | Freeman |
| 4,264,925 A | 4/1981 | Freeman et al. |
| 4,270,145 A | 5/1981 | Farina |
| 4,271,532 A | 6/1981 | Wine |
| 4,276,597 A | 6/1981 | Dissly et al. |
| 4,280,148 A | 7/1981 | Saxena |
| 4,283,787 A | 8/1981 | Chambers |
| 4,287,593 A | 9/1981 | Stover |
| 4,288,809 A | 9/1981 | Yabe |
| 4,290,142 A | 9/1981 | Schnee et al. |
| 4,305,101 A | 12/1981 | Yarbrough et al. |
| 4,307,446 A | 12/1981 | Barton et al. |
| 4,329,684 A | 5/1982 | Monteath et al. |
| 4,331,974 A | 5/1982 | Cogswell et al. |
| 4,337,480 A | 6/1982 | Bourassin et al. |
| 4,337,483 A | 6/1982 | Guillou |
| 4,344,090 A | 8/1982 | Belisomi et al. |
| 4,347,498 A | 8/1982 | Lee et al. |
| 4,367,559 A | 1/1983 | Tults |
| 4,375,651 A | 3/1983 | Templin et al. |
| 4,381,522 A | 4/1983 | Lambert |
| 4,388,645 A | 6/1983 | Cox et al. |
| 4,390,901 A | 6/1983 | Keiser |
| 4,393,376 A | 7/1983 | Thomas |
| 4,405,946 A | 9/1983 | Knight |
| 4,412,244 A | 10/1983 | Shanley, II |
| 4,413,281 A | 11/1983 | Thonnart |
| 4,420,769 A | 12/1983 | Novak |
| 4,425,579 A | 1/1984 | Merrell |
| 4,425,581 A | 1/1984 | Schweppe et al. |
| 4,429,385 A | 1/1984 | Cichelli et al. |
| 4,439,784 A | 3/1984 | Furukawa et al. |
| 4,449,249 A | 5/1984 | Price |
| 4,456,925 A | 6/1984 | Skerlos et al. |
| 4,466,017 A | 8/1984 | Banker |
| 4,477,830 A | 10/1984 | Lindman et al. |
| 4,488,179 A | 12/1984 | Kruger et al. |
| 4,495,654 A | 1/1985 | Deiss |
| 4,496,171 A | 1/1985 | Cherry |
| 4,496,976 A | 1/1985 | Swanson et al. |
| 4,510,623 A | 4/1985 | Bonneau et al. |
| 4,521,806 A | 6/1985 | Abraham |
| 4,523,228 A | 6/1985 | Banker |
| 4,527,194 A | 7/1985 | Sirazi |
| 4,531,020 A | 7/1985 | Wechselberger et al. |
| 4,533,910 A | 8/1985 | Sukonick et al. |
| 4,536,791 A | 8/1985 | Campbell et al. |
| 4,547,804 A | 10/1985 | Greenberg |
| 4,554,584 A | 11/1985 | Elam et al. |
| 4,555,775 A | 11/1985 | Pike |
| 4,566,034 A | 1/1986 | Harger et al. |
| 4,567,512 A | 1/1986 | Abraham |
| 4,573,072 A | 2/1986 | Freeman |
| 4,587,514 A | 5/1986 | Schas et al. |
| 4,587,520 A | 5/1986 | Astle |
| 4,590,516 A | 5/1986 | Abraham |
| 4,595,951 A | 6/1986 | Filliman |
| 4,595,952 A | 6/1986 | Filliman |
| 4,598,288 A | 7/1986 | Yarbrough et al. |
| 4,602,279 A | 7/1986 | Freeman |
| 4,605,964 A | 8/1986 | Chard |
| 4,605,973 A | 8/1986 | Von Kohorn |
| 4,620,229 A | 10/1986 | Amano et al. |
| 4,622,545 A | 11/1986 | Atkinson |
| 4,623,920 A | 11/1986 | Dufresne et al. |
| 4,635,109 A | 1/1987 | Comeau |
| 4,635,121 A | 1/1987 | Hoffman |
| 4,641,205 A | 2/1987 | Beyers, Jr. |
| 4,677,466 A | 6/1987 | Lert, Jr. et al. |
| 4,685,131 A | 8/1987 | Horne |
| 4,689,022 A | 8/1987 | Peers et al. |
| 4,691,351 A | 9/1987 | Hayashi et al. |
| 4,694,490 A | 9/1987 | Harvey et al. |
| 4,701,794 A | 10/1987 | Froling et al. |
| 4,704,725 A | 11/1987 | Harvey et al. |
| 4,706,121 A | 11/1987 | Young |
| 4,710,971 A | 12/1987 | Nozaki et al. |
| 4,712,105 A | 12/1987 | Kohler |
| 4,718,107 A | 1/1988 | Hayes |
| RE32,632 E | 3/1988 | Atkinson |
| 4,742,543 A | 5/1988 | Frederiksen |
| 4,745,549 A | 5/1988 | Hashimoto |
| 4,748,618 A | 5/1988 | Brown et al. |
| 4,750,036 A | 6/1988 | Martinez |
| 4,750,213 A | 6/1988 | Novak |
| 4,751,578 A | 6/1988 | Reiter et al. |
| 4,754,326 A | 6/1988 | Kram et al. |
| 4,768,228 A | 8/1988 | Clupper et al. |
| 4,772,882 A | 9/1988 | Mical |
| 4,775,935 A | 10/1988 | Yourick |
| 4,785,408 A | 11/1988 | Britton et al. |
| 4,787,063 A | 11/1988 | Muguet |
| 4,787,085 A | 11/1988 | Suto et al. |
| 4,812,834 A | 3/1989 | Wells |
| 4,814,883 A | 3/1989 | Perine et al. |
| 4,821,102 A | 4/1989 | Ichikawa et al. |
| 4,821,211 A | 4/1989 | Torres |
| 4,829,372 A | 5/1989 | McCalley et al. |
| 4,829,558 A | 5/1989 | Welsh |
| 4,829,569 A | 5/1989 | Seth-Smith et al. |
| 4,847,604 A | 7/1989 | Doyle |
| 4,847,700 A | 7/1989 | Freeman |
| 4,857,799 A | 8/1989 | Spindt et al. |
| 4,857,999 A | 8/1989 | Welsh |
| 4,862,268 A | 8/1989 | Campbell et al. |
| 4,864,429 A | 9/1989 | Eigeldinger et al. |
| 4,866,770 A | 9/1989 | Seth-Smith et al. |
| 4,868,866 A | 9/1989 | Williams, Jr. |
| 4,873,623 A | 10/1989 | Lane et al. |
| 4,882,732 A | 11/1989 | Kaminaga |
| 4,884,223 A | 11/1989 | Ingle et al. |
| 4,888,796 A | 12/1989 | Olivo, Jr. |
| 4,890,320 A * | 12/1989 | Monslow et al. ............. 380/211 |
| 4,890,321 A | 12/1989 | Seth-Smith et al. |
| 4,894,789 A | 1/1990 | Yee |
| 4,899,136 A | 2/1990 | Beard et al. |
| 4,905,094 A | 2/1990 | Pocock et al. |
| 4,908,707 A | 3/1990 | Kinghorn |
| 4,908,713 A | 3/1990 | Levine |

(56) References Cited

U.S. PATENT DOCUMENTS

| | | |
|---|---|---|
| 4,908,859 A | 3/1990 | Bennett et al. |
| 4,914,517 A | 4/1990 | Duffield |
| 4,914,732 A | 4/1990 | Henderson et al. |
| 4,930,158 A | 5/1990 | Vogel |
| 4,930,160 A | 5/1990 | Vogel |
| 4,931,783 A | 6/1990 | Atkinson |
| 4,935,865 A | 6/1990 | Rowe et al. |
| 4,937,821 A | 6/1990 | Boulton |
| 4,937,863 A | 6/1990 | Robert et al. |
| 4,939,507 A | 7/1990 | Beard et al. |
| 4,943,963 A | 7/1990 | Waechter et al. |
| 4,959,719 A | 9/1990 | Strubbe et al. |
| 4,959,720 A | 9/1990 | Duffield et al. |
| 4,963,994 A | 10/1990 | Levine |
| 4,977,455 A | 12/1990 | Young |
| 4,982,430 A | 1/1991 | Frezza et al. |
| 4,987,486 A | 1/1991 | Johnson et al. |
| 4,991,011 A | 2/1991 | Johnson et al. |
| 4,991,012 A | 2/1991 | Yoshino |
| 4,992,940 A | 2/1991 | Dworkin |
| 4,994,908 A | 2/1991 | Kuban et al. |
| 4,994,909 A | 2/1991 | Graves et al. |
| 4,995,078 A | 2/1991 | Monslow et al. |
| 4,996,642 A | 2/1991 | Hey |
| 4,998,171 A | 3/1991 | Kim et al. |
| 5,001,554 A | 3/1991 | Johnson et al. |
| 5,003,591 A | 3/1991 | Kauffman et al. |
| 5,008,853 A | 4/1991 | Bly et al. |
| 5,014,125 A | 5/1991 | Pocock et al. |
| 5,027,400 A | 6/1991 | Baji et al. |
| 5,036,314 A | 7/1991 | Barillari et al. |
| 5,038,211 A | 8/1991 | Hallenbeck |
| 5,045,947 A | 9/1991 | Beery |
| 5,047,867 A | 9/1991 | Strubbe et al. |
| 5,053,883 A | 10/1991 | Johnson |
| 5,058,160 A | 10/1991 | Banker et al. |
| 5,062,060 A | 10/1991 | Kolnick |
| 5,068,734 A | 11/1991 | Beery |
| 5,072,412 A | 12/1991 | Henderson, Jr. et al. |
| 5,075,771 A | 12/1991 | Hashimoto |
| 5,077,607 A | 12/1991 | Johnson et al. |
| 5,083,800 A | 1/1992 | Lockton |
| 5,090,049 A | 2/1992 | Chen |
| 5,091,785 A | 2/1992 | Canfield et al. |
| 5,091,936 A | 2/1992 | Katznelson et al. |
| 5,093,921 A | 3/1992 | Bevins, Jr. |
| 5,099,319 A | 3/1992 | Esch et al. |
| 5,103,314 A | 4/1992 | Keenan |
| 5,105,184 A | 4/1992 | Pirani et al. |
| 5,119,188 A | 6/1992 | McCalley et al. |
| 5,121,476 A | 6/1992 | Yee |
| 5,123,046 A | 6/1992 | Levine |
| 5,126,851 A | 6/1992 | Yoshimura |
| 5,132,992 A * | 7/1992 | Yurt et al. ............... 375/240 |
| 5,133,079 A * | 7/1992 | Ballantyne et al. ........... 725/146 |
| 5,148,154 A | 9/1992 | Mackay et al. |
| 5,151,782 A | 9/1992 | Ferraro |
| 5,151,789 A | 9/1992 | Young |
| 5,155,591 A | 10/1992 | Wachob |
| 5,155,806 A | 10/1992 | Hoeber et al. |
| 5,157,768 A | 10/1992 | Hoeber et al. |
| 5,161,023 A | 11/1992 | Keenan |
| 5,162,905 A | 11/1992 | Itoh et al. |
| 5,170,388 A | 12/1992 | Endoh |
| 5,172,111 A | 12/1992 | Olivo, Jr. |
| 5,177,604 A | 1/1993 | Martinez |
| 5,179,439 A | 1/1993 | Hashimoto et al. |
| 5,179,654 A | 1/1993 | Richards et al. |
| 5,182,640 A | 1/1993 | Takano |
| 5,189,630 A | 2/1993 | Barstow et al. |
| 5,191,423 A | 3/1993 | Yoshida et al. |
| 5,195,092 A | 3/1993 | Wilson et al. |
| 5,195,134 A | 3/1993 | Inoue et al. |
| 5,200,823 A | 4/1993 | Yoneda et al. |
| 5,204,897 A | 4/1993 | Wyman |
| 5,206,722 A | 4/1993 | Kwan |
| 5,210,611 A | 5/1993 | Yee et al. |
| 5,212,553 A | 5/1993 | Maruoka |
| 5,214,622 A | 5/1993 | Nemoto et al. |
| 5,216,515 A | 6/1993 | Steele et al. |
| 5,220,420 A | 6/1993 | Hoarty et al. |
| 5,223,924 A | 6/1993 | Strubbe |
| 5,227,874 A | 7/1993 | Von Kohorn |
| 5,231,493 A | 7/1993 | Apitz |
| 5,231,494 A | 7/1993 | Wachob |
| RE34,340 E | 8/1993 | Freeman |
| 5,233,423 A | 8/1993 | Jernigan et al. |
| 5,233,654 A | 8/1993 | Harvey et al. |
| 5,235,415 A | 8/1993 | Bonicel et al. |
| 5,236,199 A | 8/1993 | Thompson, Jr. |
| 5,237,411 A | 8/1993 | Fink et al. |
| 5,237,417 A | 8/1993 | Hayashi et al. |
| 5,237,418 A | 8/1993 | Kaneko |
| 5,239,540 A | 8/1993 | Rovira et al. |
| 5,245,420 A | 9/1993 | Harney et al. |
| 5,247,347 A * | 9/1993 | Litteral et al. ............... 725/114 |
| 5,247,364 A | 9/1993 | Banker et al. |
| 5,247,580 A | 9/1993 | Kimura et al. |
| 5,253,066 A | 10/1993 | Vogel |
| 5,253,067 A | 10/1993 | Chaney et al. |
| 5,260,778 A | 11/1993 | Kauffman et al. |
| 5,260,788 A | 11/1993 | Takano et al. |
| 5,260,999 A | 11/1993 | Wyman |
| 5,262,860 A | 11/1993 | Fitzpatrick et al. |
| 5,283,639 A | 2/1994 | Esch et al. |
| 5,283,819 A | 2/1994 | Glick et al. |
| 5,285,272 A | 2/1994 | Bradley et al. |
| 5,293,357 A | 3/1994 | Hallenbeck |
| 5,301,028 A | 4/1994 | Banker et al. |
| 5,307,173 A | 4/1994 | Yuen et al. |
| 5,311,423 A | 5/1994 | Clark |
| 5,313,282 A | 5/1994 | Hayashi |
| 5,317,403 A | 5/1994 | Keenan |
| 5,319,445 A | 6/1994 | Fitts |
| 5,319,707 A | 6/1994 | Wasilewski et al. |
| 5,323,234 A | 6/1994 | Kawasaki |
| 5,323,240 A | 6/1994 | Amano et al. |
| 5,325,183 A | 6/1994 | Rhee |
| 5,325,423 A | 6/1994 | Lewis |
| 5,335,277 A | 8/1994 | Harvey et al. |
| 5,337,155 A | 8/1994 | Cornelis |
| 5,343,239 A | 8/1994 | Lappington et al. |
| 5,343,300 A | 8/1994 | Hennig |
| 5,345,594 A | 9/1994 | Tsuda |
| 5,347,167 A | 9/1994 | Singh |
| 5,347,632 A | 9/1994 | Filepp et al. |
| 5,351,075 A | 9/1994 | Herz et al. |
| 5,353,121 A | 10/1994 | Young et al. |
| 5,355,480 A | 10/1994 | Smith et al. |
| 5,357,276 A | 10/1994 | Banker et al. |
| 5,359,367 A | 10/1994 | Stockill |
| 5,359,601 A | 10/1994 | Wasilewski et al. |
| 5,365,282 A | 11/1994 | Levine |
| 5,367,316 A | 11/1994 | Ikezaki |
| 5,367,330 A | 11/1994 | Haave et al. |
| 5,367,571 A | 11/1994 | Bowen et al. |
| 5,373,288 A | 12/1994 | Blahut |
| 5,374,951 A | 12/1994 | Welsh |
| 5,377,317 A | 12/1994 | Bates et al. |
| 5,377,319 A | 12/1994 | Kitahara et al. |
| 5,382,983 A | 1/1995 | Kwoh et al. |
| 5,384,910 A | 1/1995 | Torres |
| 5,387,945 A | 2/1995 | Takeuchi |
| 5,396,546 A | 3/1995 | Remillard |
| 5,398,074 A | 3/1995 | Duffield et al. |
| 5,404,393 A | 4/1995 | Remillard |
| 5,410,326 A | 4/1995 | Goldstein |
| 5,410,343 A | 4/1995 | Coddington et al. |
| 5,410,344 A | 4/1995 | Graves et al. |
| 5,410,367 A | 4/1995 | Zahavi et al. |
| 5,412,720 A | 5/1995 | Hoarty |
| 5,414,756 A | 5/1995 | Levine |
| 5,416,508 A | 5/1995 | Sakuma et al. |
| 5,424,770 A | 6/1995 | Schmelzer et al. |

(56) References Cited

U.S. PATENT DOCUMENTS

| | | | |
|---|---|---|---|
| 5,425,101 A | 6/1995 | Woo et al. | |
| 5,432,561 A | 7/1995 | Strubbe | |
| 5,434,626 A | 7/1995 | Hayashi et al. | |
| 5,436,676 A | 7/1995 | Pint et al. | |
| 5,440,632 A * | 8/1995 | Bacon et al. | 380/242 |
| 5,444,499 A | 8/1995 | Saitoh | |
| 5,446,919 A | 8/1995 | Wilkins | |
| 5,452,012 A | 9/1995 | Saitoh | |
| 5,459,522 A | 10/1995 | Pint | |
| 5,461,415 A | 10/1995 | Wolf et al. | |
| 5,465,113 A | 11/1995 | Gilboy | |
| 5,465,385 A | 11/1995 | Ohga et al. | |
| 5,469,206 A | 11/1995 | Strubbe et al. | |
| 5,477,262 A | 12/1995 | Banker et al. | |
| 5,479,266 A | 12/1995 | Young et al. | |
| 5,479,268 A | 12/1995 | Young et al. | |
| 5,479,497 A | 12/1995 | Kovarik | |
| 5,481,296 A | 1/1996 | Cragun et al. | |
| 5,483,278 A | 1/1996 | Strubbe et al. | |
| 5,485,197 A | 1/1996 | Hoarty | |
| 5,485,219 A | 1/1996 | Woo | |
| 5,485,221 A | 1/1996 | Banker et al. | |
| 5,488,409 A | 1/1996 | Yuen et al. | |
| 5,495,295 A | 2/1996 | Long | |
| 5,502,504 A | 3/1996 | Marshall et al. | |
| 5,515,098 A | 5/1996 | Carles | |
| 5,515,106 A | 5/1996 | Chaney et al. | |
| 5,515,511 A | 5/1996 | Nguyen et al. | |
| 5,517,254 A | 5/1996 | Monta et al. | |
| 5,523,794 A | 6/1996 | Mankovitz et al. | |
| 5,523,796 A | 6/1996 | Marshall et al. | |
| 5,524,195 A | 6/1996 | Clanton, III et al. | |
| 5,526,034 A | 6/1996 | Hoarty et al. | |
| 5,528,304 A | 6/1996 | Cherrick et al. | |
| 5,532,735 A | 7/1996 | Blahut et al. | |
| 5,532,754 A | 7/1996 | Young et al. | |
| 5,534,911 A | 7/1996 | Levitan | |
| 5,537,141 A | 7/1996 | Harper et al. | |
| 5,539,822 A | 7/1996 | Lett | |
| 5,541,662 A | 7/1996 | Adams et al. | |
| 5,541,738 A | 7/1996 | Mankovitz | |
| 5,550,576 A | 8/1996 | Klosterman | |
| 5,552,833 A | 9/1996 | Henmi et al. | |
| 5,553,221 A | 9/1996 | Reimer et al. | |
| 5,557,338 A | 9/1996 | Maze et al. | |
| 5,557,721 A | 9/1996 | Fite et al. | |
| 5,559,548 A | 9/1996 | Davis et al. | |
| 5,559,549 A | 9/1996 | Hendricks et al. | |
| 5,559,550 A | 9/1996 | Mankovitz | |
| 5,559,942 A | 9/1996 | Gough et al. | |
| 5,561,471 A | 10/1996 | Kim et al. | |
| 5,561,709 A | 10/1996 | Remillard | |
| 5,563,648 A * | 10/1996 | Menand et al. | 725/142 |
| 5,563,665 A | 10/1996 | Chang | |
| 5,570,295 A | 10/1996 | Isenberg et al. | |
| 5,572,442 A | 11/1996 | Schulhof et al. | |
| 5,574,962 A | 11/1996 | Fardeau et al. | |
| 5,576,765 A | 11/1996 | Cheney et al. | |
| 5,579,055 A | 11/1996 | Hamilton et al. | |
| 5,581,479 A | 12/1996 | McLaughlin et al. | |
| 5,582,364 A | 12/1996 | Trulin et al. | |
| 5,583,560 A | 12/1996 | Florin et al. | |
| 5,583,563 A | 12/1996 | Wanderscheid et al. | |
| 5,583,937 A * | 12/1996 | Ullrich et al. | 380/211 |
| 5,585,838 A * | 12/1996 | Lawler et al. | 725/54 |
| 5,585,865 A | 12/1996 | Amano et al. | |
| 5,585,866 A | 12/1996 | Miller et al. | |
| 5,589,892 A | 12/1996 | Knee et al. | |
| 5,592,551 A | 1/1997 | Lett et al. | |
| 5,594,490 A | 1/1997 | Dawson et al. | |
| 5,594,509 A | 1/1997 | Florin et al. | |
| 5,594,661 A | 1/1997 | Bruner et al. | |
| 5,596,373 A | 1/1997 | White et al. | |
| 5,600,364 A * | 2/1997 | Hendricks et al. | 725/9 |
| 5,600,366 A | 2/1997 | Schulman | |
| 5,600,573 A | 2/1997 | Hendricks et al. | |
| 5,602,582 A | 2/1997 | Wanderscheid et al. | |
| 5,602,596 A | 2/1997 | Claussen et al. | |
| 5,602,597 A | 2/1997 | Bertram | |
| 5,606,374 A | 2/1997 | Bertram | |
| 5,610,653 A | 3/1997 | Abecassis | |
| 5,617,565 A | 4/1997 | Augenbraun et al. | |
| 5,619,247 A | 4/1997 | Russo | |
| 5,619,249 A | 4/1997 | Billock et al. | |
| 5,619,274 A | 4/1997 | Roop et al. | |
| 5,621,456 A | 4/1997 | Florin et al. | |
| 5,623,613 A | 4/1997 | Rowe et al. | |
| 5,627,940 A | 5/1997 | Rohra et al. | |
| 5,627,960 A * | 5/1997 | Clifford et al. | 715/842 |
| 5,629,733 A | 5/1997 | Youman et al. | |
| 5,630,119 A | 5/1997 | Aristides et al. | |
| 5,631,995 A | 5/1997 | Weissensteiner et al. | |
| 5,633,683 A | 5/1997 | Rosengren et al. | |
| 5,635,978 A | 6/1997 | Alten et al. | |
| 5,635,979 A | 6/1997 | Kostreski et al. | |
| 5,635,989 A | 6/1997 | Rothmuller | |
| 5,636,346 A | 6/1997 | Saxe | |
| 5,640,501 A | 6/1997 | Turpin | |
| 5,640,577 A | 6/1997 | Scharmer | |
| 5,642,153 A | 6/1997 | Chaney et al. | |
| 5,648,813 A | 7/1997 | Tanigawa et al. | |
| 5,648,824 A | 7/1997 | Dunn et al. | |
| 5,650,826 A | 7/1997 | Eitz | |
| 5,650,831 A | 7/1997 | Farwell | |
| 5,652,613 A | 7/1997 | Lazarus et al. | |
| 5,652,615 A | 7/1997 | Bryant et al. | |
| 5,654,748 A | 8/1997 | Matthews, III | |
| 5,654,886 A | 8/1997 | Zereski, Jr. et al. | |
| 5,657,072 A | 8/1997 | Aristides et al. | |
| 5,657,091 A | 8/1997 | Bertram | |
| 5,659,350 A | 8/1997 | Hendricks et al. | |
| 5,659,366 A | 8/1997 | Kerman | |
| 5,661,516 A | 8/1997 | Carles | |
| 5,661,517 A | 8/1997 | Budow et al. | |
| 5,663,757 A | 9/1997 | Morales | |
| 5,664,111 A | 9/1997 | Nahan et al. | |
| 5,666,293 A * | 9/1997 | Metz et al. | 709/220 |
| 5,666,498 A | 9/1997 | Amro | |
| 5,666,645 A | 9/1997 | Thomas et al. | |
| 5,668,591 A * | 9/1997 | Shintani | 725/140 |
| 5,671,276 A | 9/1997 | Eyer et al. | |
| 5,671,411 A | 9/1997 | Watts et al. | |
| 5,675,390 A | 10/1997 | Schindler et al. | |
| 5,675,752 A | 10/1997 | Scott et al. | |
| 5,677,708 A | 10/1997 | Matthews, III et al. | |
| 5,677,981 A | 10/1997 | Kato et al. | |
| 5,682,195 A | 10/1997 | Hendricks et al. | |
| 5,682,206 A | 10/1997 | Wehmeyer et al. | |
| 5,682,525 A | 10/1997 | Bouve et al. | |
| 5,686,954 A | 11/1997 | Yoshinobu et al. | |
| 5,687,331 A | 11/1997 | Volk et al. | |
| 5,689,648 A | 11/1997 | Diaz et al. | |
| 5,689,666 A | 11/1997 | Berquist et al. | |
| 5,692,214 A | 11/1997 | Levine | |
| 5,694,163 A | 12/1997 | Harrison | |
| 5,694,176 A | 12/1997 | Bruette et al. | |
| 5,694,381 A | 12/1997 | Sako | |
| 5,696,905 A | 12/1997 | Reimer et al. | |
| 5,699,107 A | 12/1997 | Lawler et al. | |
| 5,699,125 A | 12/1997 | Rzeszewski et al. | |
| 5,708,478 A | 1/1998 | Tognazzini | |
| 5,710,601 A | 1/1998 | Marshall et al. | |
| 5,710,815 A | 1/1998 | Ming et al. | |
| 5,710,884 A | 1/1998 | Dedrick | |
| 5,715,314 A | 2/1998 | Payne et al. | |
| 5,715,399 A | 2/1998 | Bezos | |
| 5,715,515 A | 2/1998 | Akins et al. | |
| 5,717,452 A | 2/1998 | Janin et al. | |
| 5,717,923 A | 2/1998 | Dedrick | |
| 5,721,829 A | 2/1998 | Dunn et al. | |
| 5,722,041 A | 2/1998 | Freadman | |
| 5,724,103 A | 3/1998 | Batchelor | |
| 5,724,521 A | 3/1998 | Dedrick | |
| 5,724,525 A | 3/1998 | Beyers, II et al. | |

(56) References Cited

U.S. PATENT DOCUMENTS

| | | | |
|---|---|---|---|
| 5,724,567 A | 3/1998 | Rose et al. | |
| 5,727,060 A | 3/1998 | Young | |
| 5,727,163 A | 3/1998 | Bezos | |
| 5,731,844 A | 3/1998 | Rauch et al. | |
| 5,734,444 A | 3/1998 | Yoshinobu | |
| 5,734,853 A | 3/1998 | Hendricks et al. | |
| 5,734,893 A | 3/1998 | Li et al. | |
| 5,737,028 A | 4/1998 | Bertram et al. | |
| 5,737,030 A | 4/1998 | Hong et al. | |
| 5,740,549 A | 4/1998 | Reilly et al. | |
| 5,751,282 A | 5/1998 | Girard et al. | |
| 5,752,080 A * | 5/1998 | Ryan | 710/8 |
| 5,752,159 A | 5/1998 | Faust et al. | |
| 5,752,160 A | 5/1998 | Dunn | |
| 5,754,258 A | 5/1998 | Hanaya et al. | |
| 5,754,771 A | 5/1998 | Epperson et al. | |
| 5,754,939 A | 5/1998 | Herz et al. | |
| 5,757,417 A | 5/1998 | Aras et al. | |
| 5,758,257 A | 5/1998 | Herz et al. | |
| 5,758,259 A | 5/1998 | Lawler | |
| 5,760,821 A | 6/1998 | Ellis et al. | |
| 5,761,372 A | 6/1998 | Yoshinobu et al. | |
| 5,761,601 A | 6/1998 | Nemirofsky et al. | |
| 5,761,606 A | 6/1998 | Wolzien | |
| 5,768,528 A | 6/1998 | Stumm | |
| 5,768,539 A | 6/1998 | Metz et al. | |
| 5,774,170 A | 6/1998 | Hite et al. | |
| 5,774,357 A | 6/1998 | Hoffberg et al. | |
| 5,774,534 A | 6/1998 | Mayer | |
| 5,774,664 A | 6/1998 | Hidary et al. | |
| 5,774,887 A | 6/1998 | Wolff et al. | |
| 5,778,181 A | 7/1998 | Hidary et al. | |
| 5,778,182 A | 7/1998 | Cathey et al. | |
| 5,778,372 A | 7/1998 | Cordell et al. | |
| 5,781,226 A | 7/1998 | Sheehan | |
| 5,781,245 A | 7/1998 | Van Der Weij et al. | |
| 5,781,246 A | 7/1998 | Alten et al. | |
| 5,784,258 A | 7/1998 | Quinn | |
| 5,790,201 A | 8/1998 | Antos | |
| 5,790,202 A | 8/1998 | Kummer et al. | |
| 5,790,426 A | 8/1998 | Robinson | |
| 5,790,753 A | 8/1998 | Krishnamoorthy et al. | |
| 5,793,438 A | 8/1998 | Bedard | |
| 5,793,964 A | 8/1998 | Rogers et al. | |
| 5,793,972 A | 8/1998 | Shane et al. | |
| 5,798,785 A | 8/1998 | Hendricks et al. | |
| 5,801,747 A | 9/1998 | Bedard | |
| 5,801,785 A | 9/1998 | Crump et al. | |
| 5,801,787 A | 9/1998 | Schein et al. | |
| 5,802,284 A | 9/1998 | Karlton et al. | |
| 5,805,154 A | 9/1998 | Brown | |
| 5,805,167 A | 9/1998 | van Cruyningen | |
| 5,805,235 A | 9/1998 | Bedard | |
| 5,805,763 A | 9/1998 | Lawler et al. | |
| 5,805,804 A | 9/1998 | Laursen et al. | |
| 5,805,806 A | 9/1998 | McArthur | |
| 5,808,608 A | 9/1998 | Young et al. | |
| 5,808,694 A | 9/1998 | Usui et al. | |
| 5,809,204 A | 9/1998 | Young et al. | |
| 5,809,214 A | 9/1998 | Nureki et al. | |
| 5,812,205 A | 9/1998 | Milnes et al. | |
| 5,815,145 A | 9/1998 | Matthews, III | |
| 5,815,671 A | 9/1998 | Morrison | |
| 5,818,438 A | 10/1998 | Howe et al. | |
| 5,818,439 A | 10/1998 | Nagasaka et al. | |
| 5,818,441 A | 10/1998 | Throckmorton et al. | |
| 5,818,511 A | 10/1998 | Farry et al. | |
| 5,818,541 A | 10/1998 | Matsuura et al. | |
| 5,818,935 A | 10/1998 | Maa | |
| 5,819,019 A | 10/1998 | Nelson | |
| 5,819,156 A | 10/1998 | Belmont | |
| 5,819,284 A | 10/1998 | Farber et al. | |
| 5,819,285 A | 10/1998 | Damico et al. | |
| 5,822,123 A | 10/1998 | Davis et al. | |
| 5,828,402 A | 10/1998 | Collings | |
| 5,828,420 A | 10/1998 | Marshall et al. | |
| 5,828,839 A | 10/1998 | Moncreiff | |
| 5,828,945 A | 10/1998 | Klosterman | |
| 5,830,068 A | 11/1998 | Brenner et al. | |
| 5,832,223 A | 11/1998 | Hara et al. | |
| 5,833,468 A | 11/1998 | Guy et al. | |
| 5,835,717 A | 11/1998 | Karlton et al. | |
| 5,838,314 A | 11/1998 | Neel et al. | |
| 5,838,383 A | 11/1998 | Chimoto et al. | |
| 5,842,010 A | 11/1998 | Jain et al. | |
| 5,842,199 A | 11/1998 | Miller et al. | |
| 5,844,552 A | 12/1998 | Gaughan et al. | |
| 5,844,620 A | 12/1998 | Coleman et al. | |
| 5,848,352 A | 12/1998 | Dougherty et al. | |
| 5,848,396 A | 12/1998 | Gerace | |
| 5,848,397 A | 12/1998 | Marsh et al. | |
| 5,850,218 A | 12/1998 | LaJoie et al. | |
| 5,852,437 A | 12/1998 | Wugofski et al. | |
| 5,861,881 A | 1/1999 | Freeman et al. | |
| 5,861,906 A | 1/1999 | Dunn et al. | |
| 5,862,292 A | 1/1999 | Kubota et al. | |
| 5,867,226 A | 2/1999 | Wehmeyer | |
| 5,867,227 A | 2/1999 | Yamaguchi | |
| 5,872,588 A | 2/1999 | Aras et al. | |
| 5,873,660 A | 2/1999 | Walsh et al. | |
| 5,874,985 A | 2/1999 | Matthews, III | |
| 5,875,108 A | 2/1999 | Hoffberg et al. | |
| 5,877,906 A | 3/1999 | Nagasawa et al. | |
| 5,880,768 A | 3/1999 | Lemmons et al. | |
| 5,883,677 A | 3/1999 | Hofmann | |
| 5,886,691 A | 3/1999 | Furuya et al. | |
| 5,886,731 A | 3/1999 | Ebisawa | |
| 5,889,950 A | 3/1999 | Kuzma | |
| 5,892,498 A | 4/1999 | Marshall et al. | |
| 5,892,535 A | 4/1999 | Allen et al. | |
| 5,892,767 A | 4/1999 | Bell et al. | |
| 5,900,905 A | 5/1999 | Shoff et al. | |
| 5,903,314 A | 5/1999 | Niijima et al. | |
| 5,903,545 A | 5/1999 | Sabourin et al. | |
| 5,903,816 A | 5/1999 | Broadwin et al. | |
| 5,905,497 A | 5/1999 | Vaughan et al. | |
| 5,907,322 A | 5/1999 | Kelly et al. | |
| 5,907,323 A | 5/1999 | Lawler et al. | |
| 5,907,366 A | 5/1999 | Farmer et al. | |
| 5,914,712 A | 6/1999 | Sartain et al. | |
| 5,914,746 A * | 6/1999 | Matthews et al. | 725/132 |
| 5,917,481 A | 6/1999 | Rzeszewski et al. | |
| 5,917,830 A | 6/1999 | Chen et al. | |
| 5,918,010 A | 6/1999 | Appleman et al. | |
| 5,918,014 A | 6/1999 | Robinson | |
| 5,920,700 A | 7/1999 | Gordon et al. | |
| 5,923,848 A | 7/1999 | Goodhand et al. | |
| 5,929,849 A | 7/1999 | Kikinis | |
| 5,929,850 A | 7/1999 | Broadwin et al. | |
| 5,929,932 A | 7/1999 | Otsuki et al. | |
| 5,931,905 A | 8/1999 | Hashimoto et al. | |
| 5,936,679 A | 8/1999 | Kasahara et al. | |
| 5,937,160 A | 8/1999 | Davis et al. | |
| 5,940,073 A | 8/1999 | Klosterman et al. | |
| 5,940,572 A | 8/1999 | Balaban et al. | |
| 5,945,988 A | 8/1999 | Williams et al. | |
| 5,946,386 A | 8/1999 | Rogers et al. | |
| 5,949,954 A | 9/1999 | Young et al. | |
| 5,951,642 A | 9/1999 | Onoe et al. | |
| 5,955,988 A | 9/1999 | Blonstein et al. | |
| 5,956,505 A * | 9/1999 | Manduley | 713/1 |
| 5,959,688 A | 9/1999 | Schein et al. | |
| 5,960,411 A | 9/1999 | Hartman et al. | |
| 5,969,748 A | 10/1999 | Casement et al. | |
| 5,973,683 A | 10/1999 | Cragun et al. | |
| 5,974,222 A | 10/1999 | Yuen et al. | |
| 5,977,964 A | 11/1999 | Williams et al. | |
| 5,982,445 A | 11/1999 | Eyer et al. | |
| 5,983,236 A | 11/1999 | Yager et al. | |
| 5,986,650 A | 11/1999 | Ellis et al. | |
| 5,988,078 A | 11/1999 | Levine | |
| 5,990,890 A | 11/1999 | Etheredge | |
| 5,990,927 A | 11/1999 | Hendricks et al. | |
| 5,991,799 A | 11/1999 | Yen et al. | |

(56) References Cited

U.S. PATENT DOCUMENTS

| | | |
|---|---|---|
| 5,999,912 A | 12/1999 | Wodarz et al. |
| 6,002,393 A | 12/1999 | Hite et al. |
| 6,002,394 A | 12/1999 | Schein et al. |
| 6,005,562 A | 12/1999 | Shiga et al. |
| 6,005,563 A | 12/1999 | White et al. |
| 6,005,565 A | 12/1999 | Legall et al. |
| 6,005,597 A | 12/1999 | Barrett et al. |
| 6,006,257 A | 12/1999 | Slezak |
| 6,008,802 A | 12/1999 | Iki et al. |
| 6,008,803 A | 12/1999 | Rowe et al. |
| 6,011,546 A | 1/2000 | Bertram |
| 6,014,137 A | 1/2000 | Burns |
| 6,014,184 A | 1/2000 | Knee et al. |
| 6,014,502 A | 1/2000 | Moraes |
| 6,016,141 A | 1/2000 | Knudson et al. |
| 6,018,372 A | 1/2000 | Etheredge |
| 6,018,768 A | 1/2000 | Ullman et al. |
| 6,020,880 A | 2/2000 | Naimpally |
| 6,020,883 A | 2/2000 | Herz et al. |
| 6,020,929 A | 2/2000 | Marshall et al. |
| 6,023,267 A | 2/2000 | Chapuis et al. |
| 6,025,837 A | 2/2000 | Matthews, III et al. |
| 6,025,886 A | 2/2000 | Koda |
| 6,028,599 A | 2/2000 | Yuen et al. |
| 6,029,045 A | 2/2000 | Picco et al. |
| 6,029,195 A | 2/2000 | Herz |
| 6,035,304 A | 3/2000 | Machida et al. |
| 6,047,317 A | 4/2000 | Bisdikian et al. |
| 6,049,824 A | 4/2000 | Simonin |
| 6,049,831 A | 4/2000 | Gardell et al. |
| 6,052,145 A | 4/2000 | Macrae et al. |
| 6,061,060 A | 5/2000 | Berry et al. |
| 6,061,097 A | 5/2000 | Satterfield |
| 6,064,376 A | 5/2000 | Berezowski et al. |
| 6,064,980 A | 5/2000 | Jacobi et al. |
| 6,067,303 A | 5/2000 | Aaker et al. |
| 6,067,561 A | 5/2000 | Dillon |
| 6,072,460 A | 6/2000 | Marshall et al. |
| 6,075,526 A | 6/2000 | Rothmuller |
| 6,075,551 A | 6/2000 | Berezowski et al. |
| 6,075,575 A | 6/2000 | Schein et al. |
| 6,078,348 A | 6/2000 | Klosterman et al. |
| 6,081,263 A | 6/2000 | LeGall et al. |
| 6,081,750 A | 6/2000 | Hoffberg et al. |
| 6,088,722 A | 7/2000 | Herz et al. |
| 6,091,883 A | 7/2000 | Artigalas et al. |
| 6,098,065 A | 8/2000 | Skillen et al. |
| 6,104,705 A | 8/2000 | Ismail et al. |
| 6,108,042 A | 8/2000 | Adams et al. |
| 6,111,614 A | 8/2000 | Mugura et al. |
| 6,112,186 A | 8/2000 | Bergh et al. |
| 6,115,057 A | 9/2000 | Kwoh et al. |
| 6,118,492 A | 9/2000 | Milnes et al. |
| 6,119,098 A | 9/2000 | Guyot et al. |
| 6,119,101 A | 9/2000 | Peckover |
| 6,122,011 A | 9/2000 | Dias et al. |
| 6,125,230 A | 9/2000 | Yaginuma |
| 6,125,259 A | 9/2000 | Perlman |
| 6,133,909 A | 10/2000 | Schein et al. |
| 6,139,177 A | 10/2000 | Venkatraman et al. |
| 6,141,003 A | 10/2000 | Chor et al. |
| 6,147,714 A | 11/2000 | Terasawa et al. |
| 6,151,059 A | 11/2000 | Schein et al. |
| 6,151,643 A | 11/2000 | Cheng et al. |
| 6,154,203 A | 11/2000 | Yuen et al. |
| 6,157,411 A | 12/2000 | Williams et al. |
| 6,157,413 A | 12/2000 | Hanafee et al. |
| 6,160,545 A | 12/2000 | Eyer et al. |
| 6,160,546 A | 12/2000 | Thompson et al. |
| 6,160,570 A | 12/2000 | Sitnik |
| 6,163,316 A | 12/2000 | Killian |
| 6,163,345 A | 12/2000 | Noguchi et al. |
| 6,166,728 A | 12/2000 | Haman et al. |
| 6,169,542 B1 | 1/2001 | Hooks et al. |
| 6,172,674 B1 | 1/2001 | Etheredge |
| 6,172,677 B1 | 1/2001 | Stautner et al. |
| 6,173,271 B1 | 1/2001 | Goodman et al. |
| 6,177,931 B1 | 1/2001 | Alexander et al. |
| 6,178,446 B1 | 1/2001 | Gerszberg et al. |
| 6,181,335 B1 | 1/2001 | Hendricks et al. |
| 6,184,877 B1 | 2/2001 | Dodson et al. |
| 6,186,443 B1 | 2/2001 | Shaffer |
| 6,191,780 B1 | 2/2001 | Martin et al. |
| 6,202,212 B1 | 3/2001 | Sturgeon et al. |
| 6,208,335 B1 | 3/2001 | Gordon et al. |
| 6,209,129 B1 | 3/2001 | Carr et al. |
| 6,209,130 B1 | 3/2001 | Rector, Jr. et al. |
| 6,212,553 B1 | 4/2001 | Lee et al. |
| 6,216,264 B1 | 4/2001 | Maze et al. |
| 6,222,530 B1 | 4/2001 | Sequeira |
| 6,226,442 B1 | 5/2001 | Park |
| 6,226,793 B1 | 5/2001 | Kwoh |
| 6,239,794 B1 | 5/2001 | Yuen et al. |
| 6,240,555 B1 | 5/2001 | Shoff et al. |
| 6,253,203 B1 | 6/2001 | O'Flaherty et al. |
| 6,256,071 B1 | 7/2001 | Hiroi |
| 6,256,785 B1 | 7/2001 | Klappert et al. |
| 6,257,268 B1 | 7/2001 | Hope et al. |
| 6,262,721 B1 | 7/2001 | Tsukidate et al. |
| 6,262,722 B1 | 7/2001 | Allison et al. |
| 6,263,501 B1 | 7/2001 | Schein et al. |
| 6,263,507 B1 | 7/2001 | Ahmad et al. |
| 6,268,849 B1 | 7/2001 | Boyer et al. |
| 6,275,268 B1 | 8/2001 | Ellis et al. |
| 6,279,157 B1 | 8/2001 | Takasu |
| 6,285,713 B1 | 9/2001 | Nakaya et al. |
| 6,286,140 B1 | 9/2001 | Ivanyi |
| 6,288,716 B1 | 9/2001 | Humpleman et al. |
| 6,289,346 B1 | 9/2001 | Milewski et al. |
| 6,298,482 B1 | 10/2001 | Seidman et al. |
| 6,301,538 B1 | 10/2001 | Kirchhoffer et al. |
| 6,304,651 B1 | 10/2001 | Cramer et al. |
| 6,310,886 B1 | 10/2001 | Barton |
| 6,311,329 B1 | 10/2001 | Terakado et al. |
| 6,311,877 B1 | 11/2001 | Yang et al. |
| 6,312,336 B1 | 11/2001 | Handelman et al. |
| 6,317,885 B1 | 11/2001 | Fries |
| 6,320,588 B1 | 11/2001 | Palmer et al. |
| 6,323,911 B1 | 11/2001 | Schein et al. |
| 6,331,877 B1 | 12/2001 | Bennington et al. |
| 6,335,963 B1 | 1/2002 | Bosco |
| 6,341,195 B1 | 1/2002 | Mankovitz et al. |
| 6,341,374 B2 | 1/2002 | Schein et al. |
| 6,342,926 B1 | 1/2002 | Hanafee et al. |
| 6,357,042 B2 | 3/2002 | Srinivasan et al. |
| 6,357,043 B1 | 3/2002 | Ellis et al. |
| 6,359,636 B1 | 3/2002 | Schindler et al. |
| 6,363,525 B1 | 3/2002 | Dougherty et al. |
| 6,373,528 B1 | 4/2002 | Bennington et al. |
| 6,381,582 B1 | 4/2002 | Walker et al. |
| 6,388,714 B1 | 5/2002 | Schein et al. |
| 6,389,593 B1 | 5/2002 | Yamagishi |
| 6,392,710 B1 | 5/2002 | Gonsalves et al. |
| 6,396,546 B1 | 5/2002 | Alten et al. |
| 6,400,407 B1 | 6/2002 | Zigmond et al. |
| 6,405,371 B1 | 6/2002 | Oosterhout et al. |
| 6,408,437 B1 | 6/2002 | Hendricks et al. |
| 6,411,308 B1 | 6/2002 | Blonstein et al. |
| 6,411,696 B1 | 6/2002 | Iverson et al. |
| 6,412,110 B1 | 6/2002 | Schein et al. |
| 6,418,556 B1 | 7/2002 | Bennington et al. |
| 6,421,067 B1 | 7/2002 | Kamen et al. |
| 6,437,836 B1 | 8/2002 | Huang et al. |
| 6,446,261 B1 | 9/2002 | Rosser |
| 6,453,471 B1 | 9/2002 | Klosterman |
| 6,463,585 B1 | 10/2002 | Hendricks et al. |
| 6,469,753 B1 | 10/2002 | Klosterman et al. |
| 6,470,497 B1 | 10/2002 | Ellis et al. |
| 6,477,579 B1 | 11/2002 | Kunkel et al. |
| 6,477,705 B1 | 11/2002 | Yuen et al. |
| 6,486,920 B2 | 11/2002 | Arai et al. |
| 6,498,895 B2 | 12/2002 | Young et al. |
| 6,505,348 B1 | 1/2003 | Knowles et al. |
| 6,515,680 B1 | 2/2003 | Hendricks et al. |

(56) References Cited

U.S. PATENT DOCUMENTS

| | | |
|---|---|---|
| 6,539,548 B1 | 3/2003 | Hendricks et al. |
| 6,545,722 B1 | 4/2003 | Schultheiss et al. |
| 6,546,556 B1 | 4/2003 | Kataoka et al. |
| 6,564,378 B1 | 5/2003 | Satterfield et al. |
| 6,564,379 B1 | 5/2003 | Knudson et al. |
| 6,574,424 B1 | 6/2003 | Dimitri et al. |
| 6,588,013 B1 | 7/2003 | Lumley et al. |
| 6,600,364 B1 | 7/2003 | Liang et al. |
| 6,600,503 B2 | 7/2003 | Stautner et al. |
| 6,606,128 B2 | 8/2003 | Hanafee et al. |
| 6,622,306 B1 | 9/2003 | Kamada |
| 6,631,523 B1 | 10/2003 | Matthews, III et al. |
| 6,651,251 B1 | 11/2003 | Shoff et al. |
| 6,660,503 B2 | 12/2003 | Kierulff |
| 6,661,468 B2 | 12/2003 | Alten et al. |
| 6,665,869 B1 | 12/2003 | Ellis et al. |
| 6,687,906 B1 | 2/2004 | Yuen et al. |
| 6,698,020 B1 | 2/2004 | Zigmond et al. |
| 6,732,369 B1 | 5/2004 | Schein et al. |
| 6,738,978 B1 | 5/2004 | Hendricks et al. |
| 6,742,183 B1 | 5/2004 | Reynolds et al. |
| 6,751,800 B1 | 6/2004 | Fukuda et al. |
| 6,754,904 B1 | 6/2004 | Cooper et al. |
| 6,756,997 B1 | 6/2004 | Ward, III et al. |
| 6,757,906 B1 | 6/2004 | Look et al. |
| 6,799,326 B2 | 9/2004 | Boylan, III et al. |
| 6,799,327 B1 | 9/2004 | Reynolds et al. |
| 6,828,993 B1 | 12/2004 | Hendricks et al. |
| 6,865,746 B1 | 3/2005 | Herrington et al. |
| 6,868,551 B1 | 3/2005 | Lawler et al. |
| 6,898,762 B2 | 5/2005 | Ellis et al. |
| 6,928,652 B1 | 8/2005 | Goldman |
| 6,938,208 B2 | 8/2005 | Reichardt |
| 6,973,669 B2 | 12/2005 | Daniels |
| 6,983,478 B1 | 1/2006 | Grauch et al. |
| 7,003,792 B1 | 2/2006 | Yuen |
| 7,028,326 B1 | 4/2006 | Westlake et al. |
| 7,058,635 B1 | 6/2006 | Shah-Nazaroff et al. |
| 7,069,576 B1 | 6/2006 | Knudson et al. |
| 7,165,098 B1 | 1/2007 | Boyer et al. |
| 7,185,355 B1 | 2/2007 | Ellis et al. |
| 7,187,847 B2 | 3/2007 | Young et al. |
| 7,266,833 B2 | 9/2007 | Ward, III et al. |
| 7,293,276 B2 | 11/2007 | Phillips et al. |
| 7,328,450 B2 | 2/2008 | Macrae et al. |
| 7,392,532 B2 | 6/2008 | White et al. |
| 7,480,929 B2 | 1/2009 | Klosterman et al. |
| 7,571,457 B1 * | 8/2009 | Hendricks et al. .......... 725/132 |
| 7,665,109 B2 | 2/2010 | Matthews, III et al. |
| 8,010,979 B2 | 8/2011 | Lemmons et al. |
| 8,112,776 B2 | 2/2012 | Schein et al. |
| 2001/0001160 A1 | 5/2001 | Shoff et al. |
| 2001/0029610 A1 | 10/2001 | Corvin et al. |
| 2001/0042246 A1 | 11/2001 | Yuen et al. |
| 2001/0047298 A1 | 11/2001 | Moore et al. |
| 2001/0049820 A1 | 12/2001 | Barton |
| 2001/0054181 A1 | 12/2001 | Corvin |
| 2002/0042913 A1 | 4/2002 | Ellis et al. |
| 2002/0042914 A1 | 4/2002 | Walker et al. |
| 2002/0042918 A1 | 4/2002 | Townsend et al. |
| 2002/0049973 A1 | 4/2002 | Alten et al. |
| 2002/0059599 A1 | 5/2002 | Schein et al. |
| 2002/0059602 A1 | 5/2002 | Macrae et al. |
| 2002/0073424 A1 | 6/2002 | Ward, III et al. |
| 2002/0083439 A1 | 6/2002 | Eldering |
| 2002/0092017 A1 | 7/2002 | Klosterman et al. |
| 2002/0112249 A1 | 8/2002 | Hendricks et al. |
| 2002/0120933 A1 | 8/2002 | Knudson et al. |
| 2002/0124249 A1 | 9/2002 | Shintani et al. |
| 2002/0138840 A1 | 9/2002 | Schein et al. |
| 2003/0005432 A1 | 1/2003 | Ellis et al. |
| 2003/0005445 A1 | 1/2003 | Schein et al. |
| 2003/0110499 A1 | 6/2003 | Knudson et al. |
| 2003/0115602 A1 | 6/2003 | Knee et al. |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0196203 A1 | 10/2003 | Ellis et al. |
| 2003/0204847 A1 | 10/2003 | Ellis et al. |
| 2003/0208756 A1 | 11/2003 | Macrae et al. |
| 2003/0208758 A1 | 11/2003 | Schein et al. |
| 2004/0003407 A1 | 1/2004 | Hanafee et al. |
| 2004/0049787 A1 | 3/2004 | Maissel et al. |
| 2004/0078809 A1 | 4/2004 | Drazin |
| 2004/0078815 A1 | 4/2004 | Lemmons et al. |
| 2004/0111742 A1 | 6/2004 | Hendricks et al. |
| 2004/0139465 A1 | 7/2004 | Matthews, III et al. |
| 2004/0168189 A1 | 8/2004 | Reynolds et al. |
| 2004/0194131 A1 | 9/2004 | Ellis et al. |
| 2004/0194138 A1 | 9/2004 | Boylan, III et al. |
| 2004/0210935 A1 | 10/2004 | Schein et al. |
| 2004/0221310 A1 | 11/2004 | Herrington et al. |
| 2005/0015815 A1 | 1/2005 | Shoff et al. |
| 2005/0097622 A1 | 5/2005 | Zigmond et al. |
| 2005/0138660 A1 | 6/2005 | Boyer et al. |
| 2005/0155056 A1 | 7/2005 | Knee et al. |
| 2005/0157217 A1 | 7/2005 | Hendricks |
| 2005/0198668 A1 | 9/2005 | Yuen et al. |
| 2005/0204382 A1 | 9/2005 | Ellis |
| 2005/0204388 A1 | 9/2005 | Knudson et al. |
| 2005/0216936 A1 | 9/2005 | Knudson et al. |
| 2005/0229214 A1 | 10/2005 | Young et al. |
| 2005/0229215 A1 | 10/2005 | Schein et al. |
| 2005/0235320 A1 | 10/2005 | Maze et al. |
| 2005/0244138 A1 | 11/2005 | O'Connor et al. |
| 2005/0278741 A1 | 12/2005 | Robarts et al. |
| 2005/0283796 A1 | 12/2005 | Flickinger |
| 2006/0037044 A1 | 2/2006 | Daniels |
| 2006/0248555 A1 | 11/2006 | Eldering |
| 2007/0271582 A1 | 11/2007 | Ellis et al. |
| 2008/0178221 A1 | 7/2008 | Schein et al. |
| 2008/0184308 A1 | 7/2008 | Herrington et al. |
| 2008/0184315 A1 | 7/2008 | Ellis et al. |
| 2008/0235725 A1 | 9/2008 | Hendricks |
| 2008/0288980 A1 | 11/2008 | Schein et al. |
| 2009/0070817 A1 | 3/2009 | Ellis et al. |

FOREIGN PATENT DOCUMENTS

| | | |
|---|---|---|
| CA | 1030505 | 5/1978 |
| CA | 1187197 | 5/1985 |
| CA | 1188811 | 6/1985 |
| CA | 1196082 | 10/1985 |
| CA | 1200911 | 2/1986 |
| CA | 2151458 | 6/1994 |
| CA | 2164608 | 12/1994 |
| CA | 2312326 | 6/1999 |
| CN | 1567986 | 1/2005 |
| DE | 29 18 846 | 11/1980 |
| DE | 32 46 225 | 6/1984 |
| DE | 3337204 | 4/1985 |
| DE | 3621263 | 1/1988 |
| DE | 3640436 A1 | 6/1988 |
| DE | 39 09 3 34 | 9/1990 |
| DE | 42 01 031 | 7/1993 |
| DE | 4217246 A1 | 12/1993 |
| DE | 4240187 | 6/1994 |
| DE | 4407701 A1 | 9/1995 |
| DE | 4440419 A1 | 5/1996 |
| DE | 19531121 | 2/1997 |
| DE | 19740079 | 3/1999 |
| DE | 19931046 | 1/2001 |
| EP | 0 055 674 | 7/1982 |
| EP | 0 239 884 | 10/1987 |
| EP | 0 276 425 A2 | 8/1988 |
| EP | 0 396 062 | 11/1990 |
| EP | 0 401 930 | 12/1990 |
| EP | 0 408 892 | 1/1991 |
| EP | 0 420 123 | 4/1991 |
| EP | 0 424 648 | 5/1991 |
| EP | 0 444 496 | 9/1991 |
| EP | 0 447 968 | 9/1991 |

(56) References Cited

FOREIGN PATENT DOCUMENTS

| | | |
|---|---|---|
| EP | 0 532 322 | 3/1993 |
| EP | 0 550 911 | 7/1993 |
| EP | 0 560 593 | 9/1993 |
| EP | 0 566 454 | 10/1993 |
| EP | 0 572 090 | 12/1993 |
| EP | 0617563 A1 | 9/1994 |
| EP | 0 624 040 A2 | 11/1994 |
| EP | 0 682 452 | 11/1995 |
| EP | 0 705 036 | 4/1996 |
| EP | 0 721 253 | 7/1996 |
| EP | 0 723369 A1 | 7/1996 |
| EP | 0 725 539 | 8/1996 |
| EP | 0 742669 | 11/1996 |
| EP | 0 752 767 | 1/1997 |
| EP | 0 753 964 | 1/1997 |
| EP | 0 762 751 | 3/1997 |
| EP | 0 772 360 | 5/1997 |
| EP | 0 774 866 A2 | 5/1997 |
| EP | 0 775 417 | 5/1997 |
| EP | 0 784 405 | 7/1997 |
| EP | 0 805 594 | 11/1997 |
| EP | 0 822 718 | 2/1998 |
| EP | 0823798 A1 | 2/1998 |
| EP | 0 827 340 | 3/1998 |
| EP | 0 834 798 | 4/1998 |
| EP | 0 836 321 | 4/1998 |
| EP | 0 837599 A2 | 4/1998 |
| EP | 0 848 554 | 6/1998 |
| EP | 0 849 948 | 6/1998 |
| EP | 0 851 681 | 7/1998 |
| EP | 0 852 442 | 7/1998 |
| EP | 0 854 645 A2 | 7/1998 |
| EP | 0 854 654 | 7/1998 |
| EP | 0 880 856 | 12/1998 |
| EP | 0 905 985 | 3/1999 |
| EP | 0 924 927 | 6/1999 |
| EP | 0 935 393 | 8/1999 |
| EP | 0 944 253 | 9/1999 |
| EP | 0 945003 B1 | 9/1999 |
| EP | 0 963 119 | 12/1999 |
| EP | 0 988 876 | 3/2000 |
| EP | 1 095 504 | 5/2001 |
| FR | 2 662 895 | 12/1991 |
| GB | 1 554 411 | 10/1979 |
| GB | 2034995 | 6/1980 |
| GB | 2126002 | 3/1984 |
| GB | 2185670 | 7/1987 |
| GB | 2 256 549 | 12/1992 |
| GB | 2256546 | 12/1992 |
| GB | 2309134 | 7/1997 |
| JP | 55-28691 | 2/1980 |
| JP | 58-137334 | 8/1983 |
| JP | 58-196738 | 11/1983 |
| JP | 58-210776 | 12/1983 |
| JP | 59-15348 | 1/1984 |
| JP | 59-141878 | 8/1984 |
| JP | 60-61935 | 4/1985 |
| JP | 61-050470 | 3/1986 |
| JP | 61-074476 | 4/1986 |
| JP | 61-105642 | 5/1986 |
| JP | 62-060370 | 3/1987 |
| JP | 62-060384 | 3/1987 |
| JP | 63-234679 | 9/1988 |
| JP | 1018380 | 1/1989 |
| JP | 10-42235 A | 2/1989 |
| JP | 1183380 | 7/1989 |
| JP | 1-307944 | 12/1989 |
| JP | 2-048879 | 2/1990 |
| JP | 3-21184 | 1/1991 |
| JP | 3-021184 | 1/1991 |
| JP | 0321184 | 1/1991 |
| JP | 03063990 | 3/1991 |
| JP | 04079053 | 3/1992 |
| JP | 04-227380 | 8/1992 |
| JP | 05-183826 | 7/1993 |
| JP | 5-324450 | 12/1993 |
| JP | 06-021907 | 1/1994 |
| JP | 06038165 | 2/1994 |
| JP | 06504165 | 5/1994 |
| JP | 06243539 | 9/1994 |
| JP | 07-020254 | 1/1995 |
| JP | 07-050259 | 2/1995 |
| JP | 7-59072 | 3/1995 |
| JP | 7-66784 | 3/1995 |
| JP | 7-73124 | 3/1995 |
| JP | 07-076592 | 3/1995 |
| JP | 7-502629 | 3/1995 |
| JP | 0759072 | 3/1995 |
| JP | 7502629 | 3/1995 |
| JP | 07-123326 | 5/1995 |
| JP | 7-131771 | 5/1995 |
| JP | 07-135621 A | 5/1995 |
| JP | 07-147657 | 6/1995 |
| JP | 07160732 | 6/1995 |
| JP | 07193762 A | 7/1995 |
| JP | 07-288759 | 10/1995 |
| JP | H07509817 | 10/1995 |
| JP | 07-321748 | 12/1995 |
| JP | 08-32528 | 2/1996 |
| JP | 08-32538 | 2/1996 |
| JP | 08-125497 | 5/1996 |
| JP | 08506941 | 7/1996 |
| JP | 08-251122 | 9/1996 |
| JP | 08-275077 | 10/1996 |
| JP | 09-037151 | 2/1997 |
| JP | 9-37168 | 2/1997 |
| JP | 09-037172 | 2/1997 |
| JP | 09-102827 | 4/1997 |
| JP | 10-143340 | 5/1998 |
| JP | 10-143349 | 5/1998 |
| JP | 10-512420 | 11/1998 |
| JP | 2838892 | 12/1998 |
| JP | 2001-213595 | 8/2001 |
| JP | 2002-279969 | 9/2002 |
| JP | 3965462 | 8/2007 |
| MX | 9800004 | 11/1998 |
| WO | WO 86/01359 | 2/1986 |
| WO | WO 86/01962 | 3/1986 |
| WO | WO 87/03766 | 6/1987 |
| WO | WO 88/04057 | 6/1988 |
| WO | WO 88/04507 | 6/1988 |
| WO | WO 89/02682 | 3/1989 |
| WO | WO 89/03085 | 4/1989 |
| WO | WO 89/12370 | 12/1989 |
| WO | WO 90/01243 | 2/1990 |
| WO | WO 90/07844 | 7/1990 |
| WO | WO 90/15507 | 12/1990 |
| WO | WO 91/00670 | 1/1991 |
| WO | WO 91/18476 | 11/1991 |
| WO | WO 92/04801 | 3/1992 |
| WO | WO 93/04473 | 3/1993 |
| WO | WO 93/05452 | 3/1993 |
| WO | WO 93/06692 | 4/1993 |
| WO | WO 93/11638 | 6/1993 |
| WO | WO 93/11639 | 6/1993 |
| WO | WO 93/11640 | 6/1993 |
| WO | WO 93/22877 | 11/1993 |
| WO | WO 93/23957 | 11/1993 |
| WO | WO 94/13096 | 6/1994 |
| WO | WO 94/13107 | 6/1994 |
| WO | WO 94/14281 | 6/1994 |
| WO | WO 94/14282 | 6/1994 |
| WO | WO 94/14283 | 6/1994 |
| WO | WO 94/14284 | 6/1994 |
| WO | WO 94/17630 | 8/1994 |
| WO | WO 94/17633 | 8/1994 |
| WO | WO 94/19881 | 9/1994 |
| WO | WO 94/19909 | 9/1994 |
| WO | WO 94/21085 | 9/1994 |
| WO | WO 94/23383 | 10/1994 |
| WO | WO 94/24826 | 10/1994 |
| WO | WO 94/29811 | 12/1994 |
| WO | WO 94/29840 | 12/1994 |
| WO | WO 94/30008 | 12/1994 |

(56) References Cited

FOREIGN PATENT DOCUMENTS

| | | |
|---|---|---|
| WO | WO 95/01056 | 1/1995 |
| WO | WO 95/01058 | 1/1995 |
| WO | WO 95/01059 | 1/1995 |
| WO | WO 95/06389 | 3/1995 |
| WO | WO 95/07003 | 3/1995 |
| WO | WO 95/10910 | 4/1995 |
| WO | WO 95/15649 | 6/1995 |
| WO | WO 95/15657 | 6/1995 |
| WO | WO 95/15658 | 6/1995 |
| WO | WO 95/16568 | 6/1995 |
| WO | WO 95/19092 | 7/1995 |
| WO | WO 95/26608 | 10/1995 |
| WO | WO 95/28055 | 10/1995 |
| WO | WO 95/28799 | 10/1995 |
| WO | WO 95/30961 | 11/1995 |
| WO | WO 95/31069 | 11/1995 |
| WO | WO 95/32583 | 11/1995 |
| WO | WO 95/32585 | 11/1995 |
| WO | WO-9532587 A1 | 11/1995 |
| WO | WO 96/07270 | 3/1996 |
| WO | WO 96/08109 | 3/1996 |
| WO | WO 96/08113 | 3/1996 |
| WO | WO 96/09721 | 3/1996 |
| WO | WO 96/13932 | 5/1996 |
| WO | WO 96/13935 | 5/1996 |
| WO | WO 96/17467 | 6/1996 |
| WO | WO 96/17473 | 6/1996 |
| WO | WO 96/21990 | 7/1996 |
| WO | WO-9620555 A1 | 7/1996 |
| WO | WO 96/26605 | 8/1996 |
| WO | WO 96/27270 | 9/1996 |
| WO | WO 96/27982 | 9/1996 |
| WO | WO-9627989 A1 | 9/1996 |
| WO | WO 96/31980 | 10/1996 |
| WO | WO 96/34467 | 10/1996 |
| WO | WO 96/34486 | 10/1996 |
| WO | WO 96/34491 | 10/1996 |
| WO | WO-96/37996 | 11/1996 |
| WO | WO 96/38799 | 12/1996 |
| WO | WO 96/41471 | 12/1996 |
| WO | WO 96/41477 | 12/1996 |
| WO | WO 96/41478 | 12/1996 |
| WO | WO-9638962 A1 | 12/1996 |
| WO | WO-9641472 A1 | 12/1996 |
| WO | WO 97/02702 | 1/1997 |
| WO | WO 97/04595 | 2/1997 |
| WO | WO 97/07656 | 3/1997 |
| WO | WO 97/13368 | 4/1997 |
| WO | WO 97/17774 | 5/1997 |
| WO | WO 97/18675 | 5/1997 |
| WO | WO 97/26612 | 7/1997 |
| WO | WO 97/31480 | 8/1997 |
| WO | WO 97/41673 | 11/1997 |
| WO | WO 97/42763 | 11/1997 |
| WO | WO 97/48230 | 12/1997 |
| WO | WO 97/49237 | 12/1997 |
| WO | WO 97/49241 | 12/1997 |
| WO | WO 97/49242 | 12/1997 |
| WO | WO-9745786 A1 | 12/1997 |
| WO | WO-9746943 A1 | 12/1997 |
| WO | WO-9747106 A1 | 12/1997 |
| WO | WO-9747143 A2 | 12/1997 |
| WO | WO-9750251 A1 | 12/1997 |
| WO | WO-9801825 A1 | 1/1998 |
| WO | WO 98/06219 | 2/1998 |
| WO | WO 98/10589 | 3/1998 |
| WO | WO 98/16062 | 4/1998 |
| WO | WO 98/17064 | 4/1998 |
| WO | WO-9817063 A1 | 4/1998 |
| WO | WO 98/20675 | 5/1998 |
| WO | WO-9821664 A1 | 5/1998 |
| WO | WO-9821877 A2 | 5/1998 |
| WO | WO-9823059 A2 | 5/1998 |
| WO | WO 98/26569 | 6/1998 |
| WO | WO 98/26584 | 6/1998 |
| WO | WO 98/27723 | 6/1998 |
| WO | WO 98/28906 | 7/1998 |
| WO | WO 98/31148 | 7/1998 |
| WO | WO 98/41020 | 9/1998 |
| WO | WO 98/43183 | 10/1998 |
| WO | WO 98/47279 | 10/1998 |
| WO | WO 98/48566 | 10/1998 |
| WO | WO 98/56172 | 12/1998 |
| WO | WO-9856173 A1 | 12/1998 |
| WO | WO 99/01984 | 1/1999 |
| WO | WO 99/04561 | 1/1999 |
| WO | WO 99/07142 | 2/1999 |
| WO | WO 99/14947 | 3/1999 |
| WO | WO-9914947 A1 | 3/1999 |
| WO | WO 99/18722 | 4/1999 |
| WO | WO 99/29109 | 6/1999 |
| WO | WO 99/30491 | 6/1999 |
| WO | WO 99/31480 | 6/1999 |
| WO | WO 99/45700 | 9/1999 |
| WO | WO 99/45701 | 9/1999 |
| WO | WO 99/45702 | 9/1999 |
| WO | WO 99/52285 | 10/1999 |
| WO | WO 99/56466 | 11/1999 |
| WO | WO 99/56473 | 11/1999 |
| WO | WO 99/60783 | 11/1999 |
| WO | WO 99/60789 | 11/1999 |
| WO | WO 00/04706 | 1/2000 |
| WO | WO 00/04708 | 1/2000 |
| WO | WO 00/05889 | 2/2000 |
| WO | WO 00/11865 | 3/2000 |
| WO | WO 00/13415 | 3/2000 |
| WO | WO 00/16548 | 3/2000 |
| WO | WO 00/27122 | 5/2000 |
| WO | WO 00/28734 | 5/2000 |
| WO | WO 00/33160 | 6/2000 |
| WO | WO 00/33224 | 6/2000 |
| WO | WO 00/33560 | 6/2000 |
| WO | WO 00/33573 | 6/2000 |
| WO | WO 00/49801 | 8/2000 |
| WO | WO 00/79798 | 12/2000 |
| WO | WO 01/01677 | 1/2001 |
| WO | WO 01/06784 | 1/2001 |
| WO | WO 01/15438 | 3/2001 |
| WO | WO 01/35662 | 5/2001 |
| WO | WO 01/89213 | 11/2001 |
| WO | WO 02/31731 | 4/2002 |
| WO | WO 02/084992 | 10/2002 |

OTHER PUBLICATIONS

U.S. Appl. No. 09/332,244, filed Jun. 11, 1999, Ellis et al.

U.S. Appl. No. 09/356,268, filed Jul. 16, 1999, Rudnick et al.

"272OR Satellite Receiver User's Guide," General Instrument, 1991, pp. 58-61.

"Addressable Converters: A New Development at CableData," *Via Cable*, vol. 1, No. 12, Dec. 1981.

Advertisement for "TV Decisions," Cable Vision, Aug. 4, 1986.

Alexander, "Visualizing cleared-off desktops," *Computerworld*, May 6, 1991, p. 20.

Antonoff, "Stay Tuned for Smart TV," *Popular Science*, Nov. 1990, pp. 62-65.

Bach et al., "Multimedia TV Set, Part 1" Radio-Fernsehen Elektronik (RFE), Sep. 1996, pp. 28, 30, 31. (English language translation attached.).

Bach et al., "Multimedia TV Set, Part 2 and Conclusion," Radio-Fernsehen Elektronik (RFE), Oct. 1996, pp. 38-40. (English language translation attached.).

Baer, "Innovative Add-On TV Products," *IEEE Transactions on Consumer Electronics*, vol. CE-25, Nov. 1979, pp. 765-771.

"Bell Atlantic Buys Cable TV Company for $22bn," *Financial Times* (London), Oct. 14, 1993 p. 65.

Bensch, "VPV Videotext Programs Videorecorder," IEEE Paper, Jun. 1988, pp. 788-792.

Bestler, "Flexible Data Structures and Interface Rituals for Rapid Development of OSD Applications," Proceedings from the Eleven Technical Sessions, 42nd Annual Convention and Exposition and Exploration of the NCTA, San Francisco, CA Jun. 6-9, 1993, pp. 223-236.

(56) References Cited

OTHER PUBLICATIONS

Brochure, "A New Approach to Addressability," CableData, undated.
Brochure, "Westar and Videotoken Network Present the CableComputer," Revised Aug. 15, 1985 (Plaintiff's 334).
Brochure, Time Inc., "Now, Through the Advances of the Computer Age, You Can Get the Information You Want, When You Want It. Instantly and Conveniently, on Your Home TV Screen," Time Teletext, Time Video Information Services, Inc., undated (V 79167-79175).
Brochure, VTN "Videotoken Network, New Dimension Television," Dec. 1985 (Plaintiff's Exhibit 313).
Brugliera, "Digital On-Screen Display—A New Technology for the Consumer Interface," Symposium Record Cable TV Sessions of the 18th International Television Symposium & Technical Exhibition—Montreux, Switzerland, Jun. 10-15, 1993, pp. 571-586.
Cable Computer User's Guide, Rev. 1, Dec. 1985 (Plaintiff's Exhibit 289).
"Cable Television Equipment," Jerrold Communications Publication, dated 1992 and 1993, pp. 8-2.1 to 8-6 and 8-14.1 to 8-14.3.
CableData, Roseville Consumer Presentation, Mar. 1985.
Carne, "The Wired Household," *IEEE Spectrum*, vol. 16 No. 10, Oct. 1979, pp. 61-66.
Chan, "Learning Considerations in User Interface Design: The Room Model," Publication of the Software Portability Laboratory, University of Waterloo, Ontario, Canada, Jul. 1984.
Chang et al., "An Open-Systems Approach to Video on Demand," *IEEE Communications Magazine*, May 1994, pp. 68-80.
Christodoulakis et al., "Browsing Within Time-Driven Multimedia Documents," publication of the Institute for Computer Research, University of Waterloo, Waterloo, Ontario, Canada Jul. 1988 pp. 219-227.
"Computer Network: Current Status and Outlook on Leading Science and Technology," *Bureau of Science & Technology* (Japan), vol. 1, Dec. 1986.
Office Actions and Replies from U.S. Appl. No. 10/453,388.
Cox et al, "Extended Services in a Digital Compression System," Proceedings from Eleven Technical Sessions: 42nd Annual Convention and Exposition of the National Cable Television Association, Jun. 1993, pp. 185-191.
"Creation/Modification of the Audio Signal Processor Setup for a PC Audio Editor," *IBM Technical Disclosure Bulletin* 30(10):367-376 (Mar. 1988).
Crowther, "Teletext and Viewdata Systems and Their Possible Extension to Europe and USA," *IEEE Transactions on Consumer Electronics* CE-25(3):299-303 (Jul. 1979).
"D2B-Home Bus Fur Audio and Video," *Selektor*, Apr. 1990, pp. 10, 12.
Damouny, "Teletext Decoders—Keeping Up With the Latest Advances," *IEEE Transactions on Consumer Electronics* CE-30(3):429-435 (Aug. 1984).
Declaration Under 37 C.F.R. § 1.132 of Richard E. Glassberg, signed Oct. 20, 2006, filed Oct. 24, 2006, from U.S. Appl. No. 10/346,266.
"Dial M for Movie", Funkschau Nov. 1994 Perspektiven, Video on Demand, pp. 78-79. (English language translation attached).
"Digital Video Broadcasting (DVB); DVB specification for data broadcasting," European Telecommunication Standards Institute, Draft EN 301 192 V1.2.1 (Jan. 1999).
DiRosa, "Bigsurf Netguide", Jul. 1995, vol. 3.1 (Sections 18,21, and 28—renumbered as pp. 1-27).
"'Duck Tales,' (1987)[TV Series 1987-1990]" Internet Movie Database (IMDB) [Retrieved on Apr. 7, 2007].
Edwardson et al., "Ceefax: A Proposed New Broadcasting Service," *Journal of the SMPTE* 83(1):14-19 (Jan. 1974).
Eitz, "Zukünftige Informations—und Datenangebote beim digitalen Femsehen—EPG Und 'Lesezeichen'," RTM Rundfunktechnische Mitteilungen, Jun. 1997, vol. 41, pp. 67-72.
Electronic Programme Guide (EPG); Protocol for a TV Guide using electronic data transmission, by European Telecommunication Standards Institute, May 1997, Valbonne, France, publication No. ETS 300 707.

"Enhanced Content Specification," "ATVEF," from the internet at http://www.atvef.com/library/spec.html, printed Aug. 22, 2001, the document bears a Copyright date of 1998, 1999, 2000.
European Examination Report dated Dec. 6, 2002 for Application No. EP 96917270.9.
European Search Report dated Nov. 19, 2002 from European Application No. 98944611.7.
European Telecommunication Standard, "Electronic Programme Guide (EPG); Protocol for a TV Guide using electronic data transmission," pp. 1-45, sections 1-11.12.7 and annex A-P, bearing a date of May 1997.
European Telecommunications Standards: Digital Broadcasting Systems for Television Sound and Data Services; Specification for Service Information (SI) in Digital Video Broadcasting (DVB) Systems, European Telecommunications Standards Institute, Dec. 1994.
"Facsimile Transmission," *NHK Research Monthly Report*, Dec. 1987(Unknown author).
Gecsei, "The Architecture of Videotex Systems," pp. 174-77; 233-38, (Prentice-Hall, Englewood Cliffs, NJ, 1983).
"Getting Started" Installation Guide, "Using StarSight 1" Manual and Remote Control "Quick Reference Guide."
Green, "Oracle—The Problems of Implementing a Teletext System on Independent Television and Their Solution," Colloquium on "Broadcast and Wired Teletext Systems—Ceefax, Oracle, Viewdata" Organized by Professional Group E14, Digest No. 197613, Jan. 13, 1976.
Hartwig et al., "Broadcasting and Processing of Program Guides for Digital TV," *Journal of the SMPTE*, pp. 727-732, Oct. 1997.
Hedger, "Telesoftware: Home Computing Via Broadcast Teletext," *IEEE Transactions on Consumer Electronics* CE-25(3):279-287 (Jul. 1979).
Hiroshi et al, "Clearface: Translucent Multiuser Interface for TeamWorkStation," ECSCW, Sep. 1991, pp. 6-10.
Hiroshi et al, "Toward an Open Shared Workspace: Computer and Video Fusion Approach of Team Workstation," *Communications of the ACM* 34(12):37-50 (Dec. 1991).
Hoarty, "Multimedia on Cable Television Systems," Symposium Record Table TV Sessions, 18th International Television Symposium and Technical Exhibition, Montreux, Switzerland, Jun. 10, 1993, pp. 555-567.
Hofmann et al., "Videotext Programmiert Videorecorder," Rundfunktechnischen Mitteilungen, *Broadcast Engineering Reports* 26(6):254-257, Nov.-Dec. 1982.
Installation Guide, "Getting Started 1" Manual and Remote Control "Quick Reference Guide."
Instruction Manual, "Using StarSight 2," StarSight Telecast, Inc., StarSight CB 1500 Customer Letter, 1994.
Instructional Manual, "Sonic the Hedgehog," Sega of America, 1992.
"Interactive Computer Conference Server," *IBM Technical Disclosure Bulletin* 34(7A):375-377 (Dec. 1991).
"Interface Device for Conventional TVs to Improve Functionality," *IBM Technical Disclosure Bulletin* 36(7):53-54 (Jul. 1993).
J. Roizen, "Teletext in the USA," *Journal of the SMPTE*, pp. 602-610, Jul. 1981.
James, "Oracle—Broadcasting the Written Word," *Wireless World*, pp. 314-316, Jul. 1973.
Judice, "Move Over Cable, Here Comes Video Via Voice Lines," *Network World*, Sep. 1986, p. 26.
Kai et al "Development of a Simulation System for Integrated Services Television," Report from Information Processing Society of Japan, Japan, Sep. 13, 1996, vol. 96, No. 90 pgs.
Karstad, "Microprocessor Control for Color-TV Receivers," *IEEE Transactions on Consumer Electronics* CE-26:149-155 (May 1980).
Kornhaas, "Von der Textprogrammierung uber TOP zum Archivsystem," Radio Fernsehen Elektronik, vol. 40, No. 8, Aug. 30, 1991, pp. 465-468, XP 000240875 Veb Verlag Technik. Berlin, DE ISSN: 1436-1574.
Leftwich et al., "StarSight Interactive Television Program Guide," Published before Apr. 19, 1995.
Leftwich et al., "StarSight Interactive Television Program Guide III", Functional/Interactional Architecture Specification Document, Orbit Interaction, Palo alto, California, Published before Apr. 19, 1995.

(56) References Cited

OTHER PUBLICATIONS

Leftwich et al.,"StarSight Interactive Television Program Guide IV," Functional/Interactional Architecture Specification Document, Orbit Interaction, Palo Alto, California, Published before Apr. 19, 1995.
Listing of computer code for operating system within the Cable Computer in 1985 (Plaintiff's Exhibit 298).
Listing of computer code for Video HTU Program (Plaintiff's Exhibit 299).
Lists>What's on Tonite! TV Listings (fwd), Internet article (On line), Jan. 28, 1995, XP 002378869 [Retrieved on Apr. 28, 2006].
Lowenstein et al., "The Inevitable March of Videotex," *Technology Review* 88:22 (1985).
M/A-Com, Inc., "Videocipher II Satellite Descrambler Owner's Manual," dated Prior Feb. 1986, pp. 1-17.
Mack Daily, "Addressable Decoder with Downloadable Operation," Proceedings from the Eleven Technical Sessions, 42nd Annual Convention and Exposition of the NCTA, Jun. 6-9, 1993, pp. 82-89.
Magid, Lawrence J. "Rewind, reply and unwind with new high-tech TV devices," *LA Times*, May 19, 1999. This document was printed from the internet on Jun. 6, 1999.
Mannes, "Smart Screens: Development of Personal Navigation Systems for TV Viewers," *Video Magazine*, Dec. 1993.
Mar. 19, 1985 letter from G. Knapp of CableData to R. Hansen of Weststar Communications, Inc. (Plaintiff's Exhibit 325).
Markowitz, "Companies Jump on Interactive Bandwagon," *Discount Store News*, Dec. 6, 1993, pp. 4 and 131.
McKenzie, "Oracle—An Information Broadcasting Service Using Data Transmission in the Vertical Interval," *Journal of the SMPTE* 83(1):6-10 (Jan. 1974).
Merrell, "Tac Timer," 1986 *NCTA Technical Papers*, pp. 203-206.
Money, "Ch. 10: Viewdata" Teletext and Viewdata pp. 112-123, 1979.
"MSI Datacasting Systems," *TV Communications Journal*, Jan. 1973.
Neumann, "WDR Online Aufbau and Perspektiven Automatisierter Online-Dienste im WDR," RTM Rundfunktechnische Mitteilungen 41:56-66 (Jun. 1997).
No subject, "Tom Schauer (tschauer@moscow.com) Thu, Sep. 28, 1995 16:46:48-700," XP-002378870 [Retrieved from the Internet Apr. 28, 2006].
"Open TV fur interaktives Fernsehen," Trend and Technik, 9-95 RFE, p. 100. (English language translation attached).
"Open TV Launches OpenStreamer™ Technology for Broadcasters to Deliver First Ever Real-Time Digital Interactive Television," from the internet at http://www.opentv.com/news/openstreamer_press_final.htm, printed on Jun. 28, 1999, the document bears a copyright date of 1999.
Peddicord, "New on TV: You Bet Your Horse," *The Sun*, Baltimore Maryland Dec. 15, 1994, 1 pg.
Pfister, "Teletext: Its Time Has Come," Prepared for the IGC Videotext / Teletext Conference, Andover, Massachusetts, Dec. 14, 1982, pp. 1-11.
Prevue Guide Brochure, Spring 1984.
Prevue Guide Brochure, Spring 1994.
"Prevue Networks and OpenTV(R) Agree to Work Together on Deploying Interactive Program Guides Worldwide," from the internet at http://www.opentv.com/news/prevuefinal.htm, printed on Jun. 28, 1999.
"Probe XL Brochure, Auto Tote Systems Inc.," (Newark, Delaware) (undated) 57 pgs.
"Prodigy Launches Interactive TV Listing", Apr. 22, 1994 Public Broadcasting Report.
Rayers, "Telesoftware by Teletext," 1984 *IEEE Conference Papers* 240:323.
Robinson et al., "'Touch-Tone' Teletext, A Combined Teletext—Viewdata System," *IEEE Transactions on Consumer Electronics* CE-25(3):288-294 (Jul. 1979).

Rogers, "Telcos vs. Cable TV : The Global View With Markets Converging and Regulatory Barriers Falling, Service Carriers Are Ready to Rumble," *Data Communications* 24(13):75-76, 78, 80, [XP000526196] (Sep. 21, 1995).
Roseville City Council Presentation, Mar. 13, 1985 (Defendant's Exhibit 226).
Schlender, "Couch Potatoes! Now It's Smart TV," Fortune, Nov. 20, 1989, pp. 111-116.
Schmuckler, "A marriage that's made in cyberspace (television networks pursue links with online information services)," May 16, 1994 *Mediaweek*, 4(20):22(3).
Sealfon, "High Tech TV," *Photographic*, Dec. 1984.
Sorce et al., "Designing a Broadband Residential Entertainment Service: A Case Study," GTE Laboratories Incorporated, undated, pp. 141-148.
Sunada et al, "Teletext Color Television Receiver Model C-29M950, C26M940," NEC Home Electronics , NEC Giho, 1987.
Supplementary European Search Report for Application No. EP 98 93 5889, completed on Sep. 28, 2001.
Sussman, "GTE Tunes in to Home TV Shopping," PC Week, Jun. 28, 1988, p. C15.
System as described in Cable Data ad.
System as described in DIP II ad.
Tech Notes: Product Updates from M/A-Com Cable Home Group, "Videocipher Owner's Manual Update," Issue No. 6, Feb. 1986.
Technical White Paper, "Open TV™ Operating Environment," (© 1998 OpenTV Inc.), pp. 1-12.
"Technological Examination & Basic Investigative Research Report on Image Databases," Japan Mechanical Engineering Organization Int'l Society for the Advancement of Image Software, Japan, Mar. 1988.
Technology: Turn on, tune in and print out—An experimental interactive television service is set to alter our viewing habits, *Financial Times* (London), Oct. 14, 1993, p. 11.
"The New Media and Broadcast Policy: An Investigation & Research Conference Report on Broadcasting Diversification," Radio Regulatory Bureau, Japan Ministry of Posts & Telecommunications, Mar. 1982.
Transcript of the Deposition of John Roop, Oct. 1996, pp. 186-187.
Trial testimony of Michael Axford, *Prevue Interactive, Inc. and United Video Satellite Group, Inc. v. StarSight Telecast, Inc.*, May 9, 1998, pp. 186-187, 295-315, and 352-357.
"TV Guide Online Set for Fall", Entertainment Marketing Letter, Aug. 1994.
"TV Listings Functional Spec.," Time Video Information Services, Inc., undated.
Ueda et al, "Impact: An Interactive Natural-Motion-Picture Dedicated Multi-Media Authoring System," *Communications of the ACM*, Mar. 1991, pp. 343-350.
Using StarSight 2, Instruction Manual, StarSight Telecast, Inc., StarSight CB 1500 Customer Letter, 1994.
Various publications of Insight Telecast, 1992 and 1993.
Veith, "Television's Teletext," Elsevier Science Publishing Co., Inc, 1983, pp. 13-20, 41-51.
Videocipher Stipulation, May 1996.
VideoGuide, "VideoGuide User's Manual," pp. 1-27 (p. 11 is the most relevant).
"Windows 98 Feature Combines TV, Terminal and the Internet," *New York Times*, Aug. 18, 1998.
Wittig et al, "Intelligent Media Agents in Interactive Television Systems," Proceedings of the International Conference on Multimedia Computing and Systems, Los Alamitos, CA, US, May 15-18, 1995, pp. 182-189, XP 000603484.
"A Financial Times Survey: Viewdata (Advertisement)," Financial Times, Mar. 20, 1979.
"A Framework for Interactive Television Based on Internet Standards," Backer et al.
"BBC Online—Schedules" web page. This web page is located at http://www.bbc.co.uk/schedules/ (as printed from the Internet on Oct. 19, 1999 and being dated as early as May 24, 1997). <http://www.bbc.co.uk/schedules/>.
"Dial M for Movie," Periodical Funkschau, vol. Nov. 1994, pp. 78-79 (with full translation).

(56) References Cited

OTHER PUBLICATIONS

"Dialing the printed page," ITT in Europe Profile, 11/Spring 1977.
"Growing US interest in the impact of viewdata," Computing Weekly, Jul. 20, 1978.
"Open TV für Interaktives Fernsehen: Trend and Technology," Periodical RFE, vol. Sep. 1995, p. 100 (with full English translation).
"Teletext presents the alternative view," Financial Times, Oct. 24, 1977.
"Three men on a Viewdata bike," The Economist, Mar. 25, 1978.
"UVSG Offers System-Specific Web Site Development for OPS," press release of United Video Satellite Group, Apr. 12, 1996.
"UVSG Teams With Microsoft on Internet Information Server," press release of United Video Satellite Group, Feb. 22, 1996.
"Viewdata and its potential impact in the USA: Final Report/Volume One, The UK Experience," Link and Butler Cox & Partners Limited, Oct. 1978.
"Viewdata moves in US but GEC may lose out," Computing Weekly, Jan. 25, 1978.
"Viewdata Service Terminal Specification," British Post Office, Issue 5, Aug. 1978.
"Web TV and Its Consumer Electronics Licensees Debut First Internet Television Network and Set-Top Box," Jul. 10, 1996 <http://www.ohlfs.com/keith/self/webtv/home/HTML/home.license.html>.
Armstrong, Larry, "Channel-Surfing's next wave: Henry Yuen's interactive TV guide takes on TCI and Viacom," BusinessWeek, Jul. 31, 1995.
Arnold, William F., "Britain to get wired city—via telephone," Electronics, Mar. 4, 1976, at 76.
Blahut et al., "Interactive Television," Proceedings of the IEEE, Jul. 1995.
Boyd-Merritt, Rick, "Television wires two-way video," Electronic Engineering Times, Apr. 25, 1994.
Day, Rebecca, "The Great PC/TV Debate," OEM Magazine, Jul. 1, 1996.
DirecTV Plus2 System, RCA, Thompson Consumer Electronics, Inc. (1999).
Hobbes Internet Timeline, Mar. 22, 2007.
Holland, Gary L., "NAPLPS standard defines graphics and text communications," EDN, Jan. 10, 1985, at 179.
Iizuka, Honbashi, Kuwana, The Overview of Internet TV Guide Japan, Building Internet TV Guide Service 1 and 2, The 53rd National Conference Proceedings, Japan, Information Processing Society of Japan, Sep. 6, 1996 p. 3-227 to 230 (partial translation).
Keith Lynch's timeline of net related terms and concepts, Mar. 22, 2007.
Large, Peter, "Throw away the books—Viewdata's coming," Guardian, Jan. 10, 1978.
Large, Peter, "Viewdata, the invention that brings boundless advice and information to the home, also sets a test for the Post Office," Financial Guardian, Jun. 29, 1978.
Leftwich, Jim & Schein, Steve, *StarSight Interactive Television Program Guide, Phase III*, Functional/Interactional Architecture Specification Document, Orbit Interaction, Palo Alto, California.
Leftwich, Jim, Lai, Willy & Schein, Steve, *StarSight Interactive Television Program Guide, Phase IV*, Functional/Interactional Architecture Specification Document, Orbit Interaction, Palo Alto, California, published before Apr. 19, 1995.
Lists> What's on Tonite TV Listings Internet Article, [Online], Jan. 28, 1995, XP002378869 Retrieved from the Internet: URL: www.scout.wisc.edu/Projects/PastProjects/NH/95-01-31/0018.html> [retrieved on Apr. 28, 2006] the whole document.
Little et al., ACM Multimedia 93 Proceedings, A Digital On-Demand Video Service Suporting Content-Based Queries, pp. 427-436, Jul. 1993.
Lloyd, John, "Impact of technology," Financial Times, Jul. 1978.

Miller, Mathew D., "A Scenario for the Deployment of Interactive Multimedia Cable Television Systems in the United States in the 1990s," IEEE, 1994.
Money, Steve A., "Teletext and Viewdata," Butterworth & Co. Ltd., London, 1979.
Mosley, J.D., "NAPLPS chip sets, though scarce, satisfy limited US videotex demand," EDN, Mar. 21, 1985, at 57.
Owen, Kenneth, "How dial-a-fact is coming closer to home," The Times, Sep. 30, 1977.
Owen, Kenneth, "Why the Post Office is so excited by its plans for a TV screen information service," The Times, Sep. 26, 1976.
Poole, James, "Demand for Viewdata grows," Sunday Times, Feb. 10, 1977.
Printout from Google News Archives, Mar. 22, 2007.
Prodigy Launches Interactive TV Listing, Apr. 22, 1994, Public Broadcasting Report.
Qayyum, Hamid, "Using IVDS and VBI for Interactive Television," IEEE, Jun. 10, 1996.
Rajapakshe et al., "Video on demand," (last modified Jun. 1995) <http://www.doc.ic.ac.uk/~nd/surprise_95/journal/vol4/shr/report.html>.
Rath et al., "Set-Top Box Control Software: A Key Component in Digital Video," Philips Journal of Research, vol. 50, No. ½, 1996, at 185.
Research Disclosure XP 000599701 "Electronic Program Guide via Internet," ed. By Kenneth Mason, GB# 385, May 1996, p. 276.
Rosch, Gary D., "New data and information system set for commercial market trial," Telephony, Mar. 20, 1978, at 96.
Ruffler et al., "InfoRadio on Demand, WebTV and digiTaz—Telecommerce Case Studies," May 23, 1996.
Ryan, Margaret, "Interactive TV Takes a Corporate Twist," Electronic Engineering Times, Jul. 10, 1995.
Schauer, Tom: Internet Article, [Online] Sep. 28, 1995, XP002378870, Retrieved from the Internet: URL: www.vision2020.moscow.com/Archives/1995/9509/0058.htlm> [retrieved on Apr. 28, 2006] the whole document.
Sharpless et al., "An advanced home terminal for interactive data communication," Conf. Rec. Int. Conf. Commun. ICC '77, IEEE, Jun. 12-15, 1977, at 19.6-47.
St. John, Sandringham, "Dress rehearsal for the PRESTEL show," New Scientist, Jun. 1, 1978, at 586.
Statement in an Examination Report dated Aug. 2, 1999 for a counterpart foreign application filed in New Zealand in which the foreign Examiner alleges that he has used "the Internet to access television listings for BBC World television as far back as mid 1996 . . . ".
Stickland, D.C., "It's a common noun," The Economist, Jun. 5, 1978.
Stokes, Adrian, "The viewdata age: Power to the People," Computing Weekly, Jan. 1, 1979.
The clickTV television program guide website of TVData of Queensbury, New York. This website is located at www.clicktv.com (as printed from the Internet on Sep. 1, 1998).
The InfoBeat television program guide website of InfoBeat, Inc. This website is located at www.infobeat.com (as printed from the Internet on Dec. 8, 1997).
The television program guide website of Gist Communications, Inc. of New York, New York. This website is located at www.gist.com (as printed from the Internet on Aug. 14, 1997).
The television program guide website of TV Guide Entertainment Network. This website is located at www.tvguide.com (as printed from the Internet on Aug. 14-22, 1997).
TV Guide movie database Internet web pages printed on Aug. 12, 1999 (9 pages).
TV Guide Online Set for Fall, Entertainment Marketing Letter, Aug. 1994.
VideoGuide, Videoguide User's Manual, pp. 1-27.
Whitehorn, Katharine, "Viewdata and you," Observer, Jul. 30, 1978.
Wikipedia article on CompuServe, Mar. 22, 2007.
Yoshida, Junko, "Interactive TV a Blur," Electronic Engineering Times, Jan. 30, 1995.

\* cited by examiner

TELEVISION SYSTEM WITH DOWNLOADABLE FEATURES

This application is a continuation of U.S. patent application Ser. No. 09/018,279, filed Feb. 4, 1998 (abandoned), which is a continuation of U.S. patent application Ser. No. 08/482,268, filed on Jun. 7, 1995 (abandoned), which is a continuation-in-part of U.S. patent application Ser. No. 08/243,598, filed on May 13, 1994, issued as U.S. Pat. No. 5,619,274, which was a continuation-in-part of U.S. patent application Ser. No. 08/239,225, filed on May 4, 1994, issued as U.S. Pat. No. 5,790,198, all of which are incorporated herein by reference in their entirety for all purposes.

BACKGROUND OF THE INVENTION

Several methods for downloading television-related information are currently available. This information is often associated with television schedule guides. Many different transmission schemes are also available for providing the information required for a television schedule guide. For example, a direct broadcast satellite system ("DUBS") can provide television program schedule information via a satellite dish in conjunction with a set-top receiver. In addition, conventional satellite dishes, coax cable, telephone lines, fiber optic cable, antenna, etc. are often used to distribute television program schedule information. For example, the vertical blanking interval ("VBI") withing a television channel, or an independent television channel can be used to provide the television program schedule information.

U.S. Pat. No. 5,353,121 is representative of systems which present television schedule guide information, and has found wide success in the industry. U.S. Pat. No. 5,353,121 is hereby incorporated by reference for all purposes. Additionally, U.S. patent application Ser. No. 08/423,411, filed Apr. 17, 1996, discloses many of the available transmission schemes for television information, and it is hereby incorporated by reference for all purposes.

There are also systems which allow a subscriber to select video(s) for display at the subscriber's location. One such system utilizes a touch tone telephone keypad to input the subscriber's selection(s). These systems are sometimes available on cable television, and they are often referred to as pay-per-view video systems.

Sometimes the software in a television becomes outdated, or perhaps even non-functional, due to new developments in the technology. Thus, adding new features, updating software and correcting software problems is sometimes desirable. Moreover, an incompatibility may arise due to newly-purchased units in the television system (e.g., a remote infrared code needed for a new VCR). In these situations, a serviceperson is needed to enter the consumer's home in order to perform a repair or update, or the consumer must bring or send the device to a retail location where the device can be serviced. In both of these situations, the consumer is exposed to a certain degree of inconvenience. Therefore, a more convenient way of providing this type of service is desirable. Additionally, when newly developed features are desired, consumers sometimes replace a still functioning unit with a new one in order to obtain those features.

Finally, manufacturers can communicate directly with their customers, but this communication is limited and costly. For example, a manufacturer can send out a mailing, make a phone call, distribute advertisements, or broadcast a commercial. While a manufacturer can direct mailings and telephone calls to consumers who have purchased a particular product, they cannot direct their television commercials in the same manner. Therefore, a system which allows for advertisements to be placed on certain consumer's televisions is desirable. Moreover, as set forth above, a system which allows manufacturers to update, replace or add television system software without the need for a repairperson is also desirable.

SUMMARY OF THE INVENTION

In the preferred embodiment, the present invention is directed to providing downloadable features, and more particularly to providing these features to identified receiving locations in a television system. Features may be desired by the manufacturer for (1) correcting software defects, (2) adding or updating software, or (3) meeting compatibility requirements. Features may also be ordered by consumers who respond to solicitations or advertisements for these features in response to advertising in the television system. For example, advertisements can be electronically delivered via a network to specific consumer's televisions (or other electronic products) based on the products' electronic serial number. These features can also add functionality to a television system. The data related to these features are compiled and sent from a main location to consumer's electronic products (e.g., televisions) in multiple receiving locations. The data are then stored in the identified receiving locations, and software is used to install the stored feature. This storing is usually done in a non-volatile or flash RAM. Each of the receiving locations has a receiver, a memory, and a processor. The receiver receives data associated with the features. These data include an identifier which identifies at least one of the receiving locations. The memory at each receiving location only stores the received data when the data's identifier identifies the associated receiving location. The processor at each receiving location uses the saved data to load, save or implement the features into the receiving locations.

These and other advantages will become apparent to those skilled in this art upon a reading of the following detailed description of the invention, which should be taken in conjunction with the accompanying drawings.

DESCRIPTION OF SPECIFIC EMBODIMENTS

Types of Features

Figure 1:
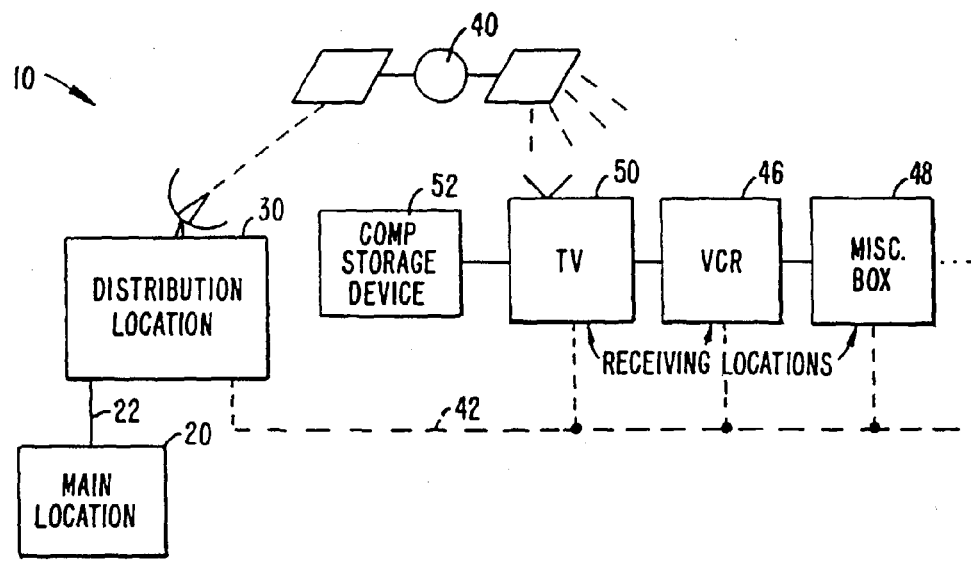
FIG. 1 is a system for broadcasting and receiving features.

The present invention provides a scheme for downloading features in a television system. A wide number of downloadable features are available in the present invention. These downloadable features usually fall into one of two categories. The first category includes software defect corrections, compatibility requirement fixes, and software updates or additions which are provided by television manufacturers or third party suppliers. For example, a television manufacturer may encounter software problems after a certain model of television has been sold and distributed. In order to correct this problem without disturbing the consumers who purchased the affected television models, the manufacturer can easily download new software which corrects the software problem. In this arrangement, a serviceperson/go-between is not required. In another example, infrared ("IR") codes may be incorrect or obsolete. IR codes can be used to allow interaction between a television and a VCR with a single remote control. Therefore, the correct IR codes are needed for a television remote control to control both a television and a VCR. In this scenario, the manufacturer can easily download new IR codes so that the consumer can use their existing television remote control to control a newly purchased or previously incompatible VCR, set-top box, etc. Again, a serviceperson is not required and the remote control or product does not need to be sent in for service.

In the second category of features, the consumer chooses which features they wish to have downloaded into or enabled in their television system. For example, the consumer may want enhancements to their user interface such that their television on-screen menu or guide contains more options. Other examples of these types of features include (1) picture-in-picture enhancements, (2) channel identification in a picture-in-picture screen, (3) the display of graphic network logos and icons with channel identification on the screen, (4) extended data service (EDS) enhancements, (5) stock quotation services, (6) virtual channel services, (7) news services, (8) weather services, and (9) sports score services.

Many of the above-identified features are already present in a television as sold, and only need to be enabled in the television system. For example, when a user selects to have the icon with the channel identification displayed, this icon is displayed in the upper left-hand corner whenever the user switches to a new channel. These icons with channel identification are usually included in the ROM of the televisions when the televisions are sold, but the icons are only activated when the proper software is present. The present invention allows this software to be easily downloaded at a later time. The downloaded software can also be used to provide additional icons for new networks.

Finally, advertisements for available features may be sent to a consumer or a group of consumers. The advertisements and information related to these advertisements can be viewed on any device with a screen (e.g., a television or a computer monitor).

Hardware Configuration

FIG. 1 is a system for broadcasting and receiving features. In the preferred embodiment, data associated with the above-described features are compiled in main location 20. Main location 20 may be, for example, a television manufacturer, a guide provider, or the like. The data are then sent over communication line 22 to distribution location 30. Line 22 can be any form of medium. In the preferred embodiment, line 22 is a telephone line. In an alternative embodiment, the compiled data are placed on a laser disk, video tape or compact disk, and sent to distribution location 30 via overnight mail or courier.

In the preferred embodiment, distribution location 30 works in conjunction with satellite 40 to broadcast data to receiving locations 46, 48 and 50. The data, in the preferred embodiment, are transported on the vertical blanking interval ("VBI") of a certain dedicated channel. As an alternative, the data can be broadcast on a dedicated television or radio frequency channel, with or without other data. The data can also be broadcast in a hi-speed digital environment. In the preferred embodiment, the broadcast is done every night, so the receiving locations can be programmed to receive and, if needed, save the received data. Receiving locations 46, 48 and 50 include, for example, VCR(s) 46, miscellaneous box(es) 48 and television(s) 50. Miscellaneous box 48 could be, for example, a set-top box (e.g., a cable box) or a TVCR (television and VCR combined into one unit). In the preferred embodiment, the receiving locations are multiple televisions 50 and VCRs 46 located within households. These receiving locations 46, 48 and/or 50 could be linked to other devices/products in order to provide updates or downloads of data to those other devices/products.

In another embodiment of the present invention, data associated with the above-described features are compiled in main location 20 and placed on a computer disk (e.g., laser disk, compact disk, floppy disk, or the like). This disk is then sent, in the preferred embodiment, via overnight mail to consumers located at receiving locations 46, 48 and/or 50. The consumer can then insert the computer disk into computer storage device 52 in order to download the data related to the above-described features into the memory within one of the receiving locations 50. Computer storage device 52 can be any commercially available disk drive. In yet another embodiment, data can be provided on a video cassette tape (or other similar media) which is then shipped to the consumer via overnight mail, so that the consumer can use their VCR 46 to download the data related to their selected feature. In this arrangement, data is read from the VBI of the video tape. Finally, the compiled data can be sent via transmission line 42. Transmission line 42 may be, for example, coax cable, telephone lines, fiber optic cable, terrestrial antenna, or the like.

When data are broadcast, as shown in the first embodiment, the data contains an indicator address which indicates at least one of the available receiving locations 46, 48 and/or 50 within system 10. As stated above, these receiving locations 46, 48 and 50 can be, for example, television, VCRs, set-top boxes, TVCRs and/or the like. Thus, a certain feature can be sent to all televisions manufactured by a particular manufacturer by placing an indicator address in the associated data which indicates such manufacturers. Each of the receiving locations 46, 48 and 50 have an exclusive identification number. This identification number, in the preferred embodiment, has sub-identification fields which include: (1) TV brand, (2) model/series number, (3) customer serial number, and (4) region number. When data are received by one of the receiving locations 46, 48 or 50, the indicator address in that data is read. If the indicator address matches the appropriate portion(s) of the identification number for one of receiving locations 46, 48 or 50, then data associated with that indicator address is saved within corresponding receiving location 46, 48 or 50. Each indicator address subfield can contain a wildcard indicator which identifies all categories which can be indicated in that subfield. For example, if the customer serial number subfield contains a wildcard indicator, all customers with the indicated television brand, etc., will save the associated data. Therefore, the indicator address can be structured to identify a specific unit, a specific model or serial number group, a specific brand, a specific production or date run, or a specific product type (i.e., television, TVCR, VCR, or set-top box)

Figure 2:
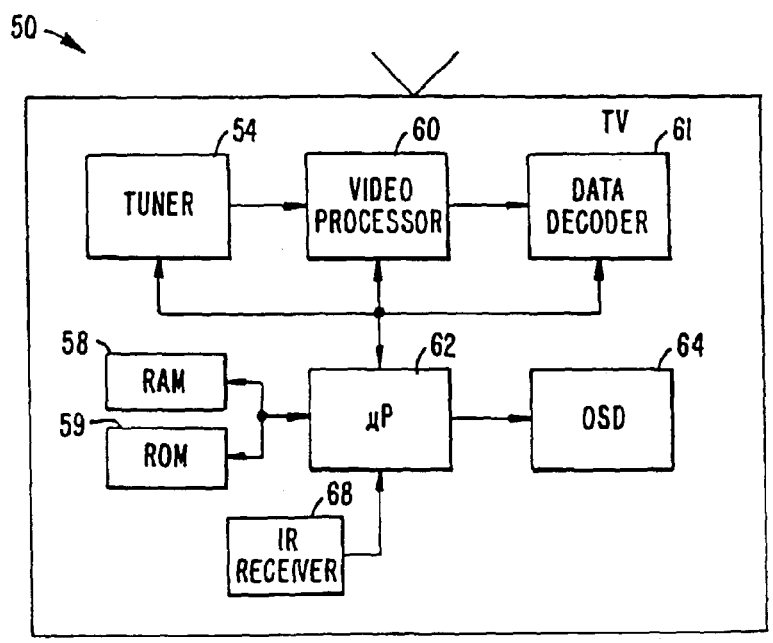
FIG. 2 reveals the basic components of a receiving television.

FIG. 2 reveals the basic components of a receiving television. As stated above, in the preferred embodiment, the receiving locations are televisions 50. The broadcast data are received by tuner 54, video processor 60 and data decoder 61, within television 50. In order to receive the broadcast data, microprocessor 62 causes tuner 54 to tune to the channel which carries the feature related data. When the received data contains an indicator address which corresponds to the appropriate portion(s) of the television's identification number, those data are saved in RAM 58. Microprocessor 62 monitors the received data at the time of broadcast for the correct indicator address. In some embodiments, after data are saved in RAM 58, on-screen display ("OSD") 64 displays messages related to the available features on the television screen.

RAM 58 is a non-volatile, battery backed-up, or flash memory such that a continual primary power supply is not required to maintain the RAM. RAM 58 contains a TV control section, a loader program, and an advanced program. In another embodiment, ROM 59 may contain a loader program and a TV control section. The TV control section is a basic program which allows television 50 to interact with remote control 100. Signals transmitted by remote control 100 are received by IR receiver 68. The loader program is used for changing the advanced program. The advanced program may or may not be included in the television when the television is initially purchased. The advanced program can be later added when data implementing a new feature are received, or portions of the advanced program can be replaced or enabled in order to provide a new feature when data implementing that feature is received. Thus, the data sent for implementing a feature includes advanced program data.

The hardware and software within television 50 (see FIG. 2) can also be located within VCR 46 or set-top box 48. When this occurs, the control section. (corresponding to the TV control section described above) is a VCR control section or a set-top box control section. Accordingly, features can be implemented into VCR 46 and set-top box 48 in the same manner as they are implement into television 50.

Software

Figure 3:
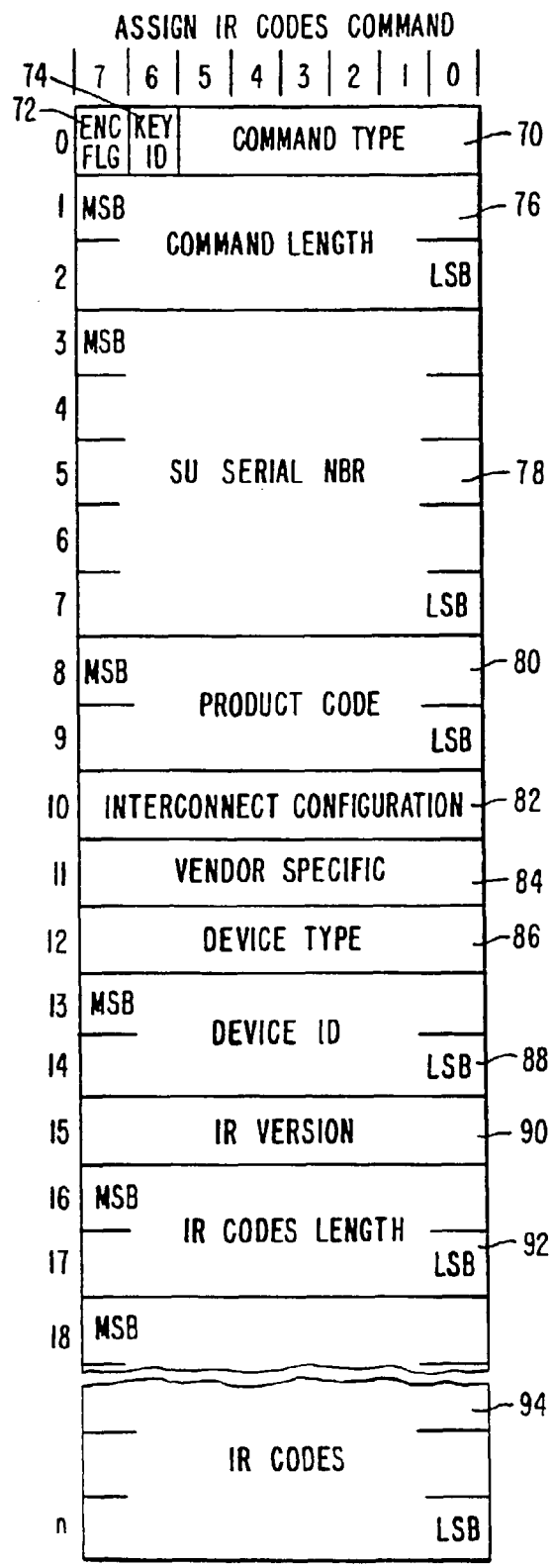
FIG. 3 is a portion of a packet of data which shows the relevant feature fields.

FIG. 3 is a portion of a packet of data which shows the relevant feature fields of one particular embodiment of the invention. In the preferred embodiment, the data associated with the features is broadcast in a packet format. Within each packet of data, information related to at least one feature is provided. For example, in FIG. 3 a portion of a particular packet for assigning IR codes is provided.

The IR Codes command specifies the control codes to be used by the remote control in order to control a specific peripheral device. In the preferred embodiment, peripheral devices include VCRs, set-top boxes, TVCRs and televisions. Transmission of this command normally occurs when a consumer has a remote control which is incompatible with one of their peripheral devices. As with other features, IR codes may be sent either addressed to a specific unit via its serial number or to groups of units which have a given product code, device type (e.g., VCR), and/or a device ID.

The IR Codes command presented in FIG. 3 includes multiple fields. The first field, field 0, includes Command Type 70. Command Type 70 identifies the command as an Assign IR Codes command. Flag 72 is also included in field 0. Flag 72 indicates if the current command has been encrypted. Decryption Key ID 74, also included in field 0, identifies which of two current program decryption keys should be used to decrypt this command, if needed. Fields 1 and 2 contain Command Length 76. These fields provide the total number of bytes contained in this command. Fields 3 through 7 contain Serial Number 78. Serial Number 78 is the consumer unit's serial number to which the command is addressed. If Serial Number=0, then the command is addressed to all consumer units having a Product Code, Device Type, and Device ID corresponding to the one in this command.

Fields 8 and 9 include Product Code 80, and field 10 includes Interconnect Configuration 82. Interconnect Configuration 82 contains a number corresponding to the way the components controlled by the peripheral devices are connected. Field 11 contains Vendor-Specific field 84. This field includes a byte value whose use value depends upon the product to which this command is addressed. For example, when this command is addressed to a particular manufacturer's television, this value is the tuning method index to be used with the downloaded IR Codes for that specific manufacturer's television. Product Code 80 contains the number identifying the type/model of consumer unit to which this command is addressed. This number also correlates with the type of remote controller for the peripheral device. This command is ignored by the consumer unit if this number does not match its Product Code when the Serial Number field=0. In addition, this field is ignored when the Serial Number field is non-zero.

Device Type 86 identifies the type of device (VCR, cable box, TV, IRD, etc.) that can recognize the IR Codes. Device ID 88 contains the code group number for the device that recognizes the IR Codes. The consumer unit (only if it has a matching address) replaces whatever group number it currently has for the given Device Type with this number. Thus, main location 20 can directly set the code group for a specific user. This is not done if the Serial Number field in this command is 0. In this case, the command is only processed if the consumer has already entered a code number that matches the Device ID for the same Device Type.

Field 15 contains IR Version 90 which has the version number for the IR Codes in this command. The identified peripheral device saves the version number for each Device Type and only processes those assign IR Codes commands addressed to groups of consumers if its version number is greater than the previously stored version number. Thus, the system does not re-process IR Codes commands. Fields 16 and 17 include IR Codes Length 92. IR Codes Length 92 contains the number of bytes in the IR Codes Fields. If this value equals 0, then only Device ID is used to update the code group for the specified Device Type and the field with the IR Codes is empty. Therefore, no downloading occurs if this field equals 0. Fields 18 through n include the IR Codes 94. IR Codes 94 contain information (normally IR Codes) to be used by the remote control to control devices of the specified type. Structure within fields 18 through n is determined by the remote control manufacturer.

In summary, when the appropriate field within a feature packet corresponds to the appropriate portion(s) of an identification number in a receiving location, microprocessor 62 saves that packet in RAM 58. The loader program then inserts data from the appropriate fields of the feature packet into the advanced program. Thus, software in the receiving location is used in conjunction with the feature command portion of the received packet to integrate a new feature.

Television Display

In the preferred embodiment, feature related data are sent in the above-described manner under three circumstances. First, data are sent when a manufacturer wants to update a device or wants to automatically fix a software problem. Consumer interaction may not be required in this situation. Thus, the data may be downloaded into the consumer's television system without the consumer's knowledge for regular maintenance purposes. If desired, a consumer can be provided with a description of all the data downloaded into their television system. If interaction is needed, remote 100 is used as described below. Second, data are sent when a new feature is available for consumer selection. In this scenario, the data is usually in the form of an advertisement. Third, data is sent to implement a feature after the feature has been ordered/purchased by a consumer. As set forth above, these features can be utilized for VCRs, televisions, TVCRs, set-top boxes, etc. When the feature data is send to a receiving site which is not a television, a television may still be used to display information related to that feature.

Figure 4:
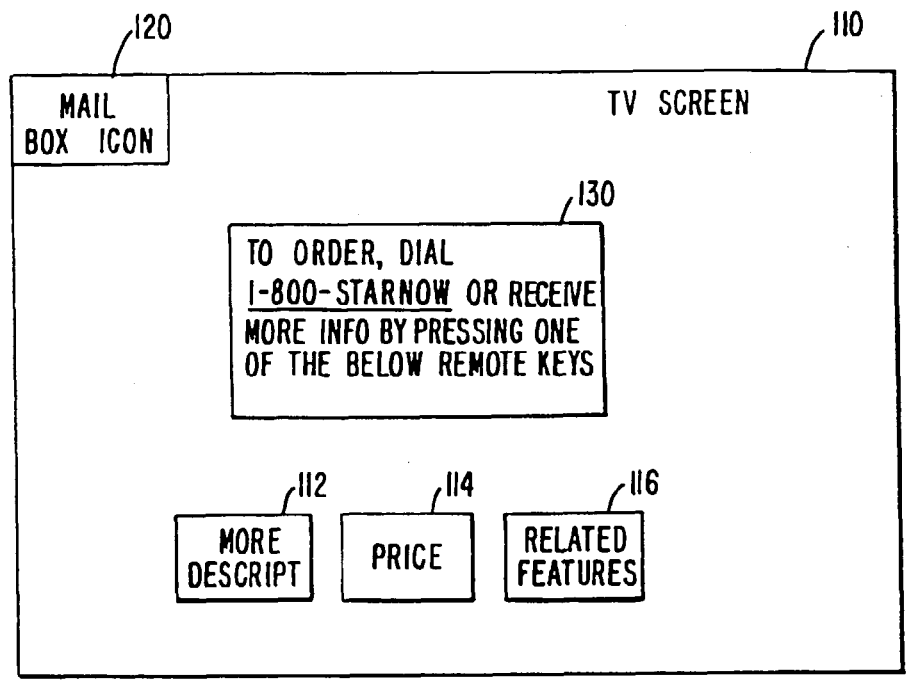
FIG. 4 reveals how information related to a feature is shown on the television screen, and how a remote can be used to gain additional information.
Figure 4:
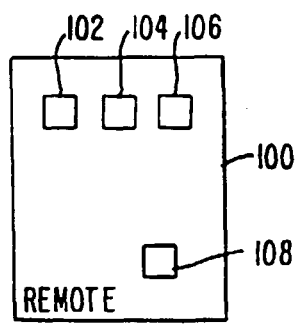

FIG. 4 reveals how information related to a feature is shown on the television screen, and how a remote can be used to gain additional information. In order to interact with television system 10, the consumer uses remote control 100 in response to messages on television screen 110. In the preferred embodiment, remote control buttons 102, 104 and 106 are initially blank. These buttons 102, 104 and 106 correspond to graphically-generated buttons 112, 114 and 116 on television screen 110. If the remote control sold with television 50 does not provide the required special buttons 102, 104 and 106, a new remote control can be sent to the consumer via overnight mail.

When data are sent to advertise a new feature to the consumer, a mailbox icon 120 is usually used to inform the consumer that the new feature is available for selection. A consumer can eliminate the display of the mailbox icon 120 when/if desired. The consumer can also receive more information related to a new feature by pressing any of special remote control buttons 102, 104 or 106 when prompted by generated buttons 112, 114 and 116.

In the preferred embodiment, when mailbox icon 120 is full (e.g., a flashing icon 120 may indicate a full mail box), the consumer can receive information related to a newly-available feature on television screen 110. This information may be provided as a demonstration after the consumer presses one of the special remote control buttons 102, 104 or 106. At the end of this short demonstration, the consumer is then prompted to either order the feature or to receive more information by pressing one of remote control buttons 102, 104 or 106. For example, an advertising message may include the following: "Now available to RCA TV owners—Deluxe digital picture-in-picture with network IDs! Call 1-800-STAR-NOW to order today. Just $19.95." The consumer is also provided with a feature ID number for ordering. In addition, at any time during the demonstration related to the newly-available feature, the consumer can return to the regular television mode by pressing button 108 on remote control 100. Button 108 can be, for example, the pre-channel button on a remote control.

When data are downloaded into a television, VCR, TVCR, or cable box to provide the consumer with a consumer-ordered feature, the consumer may have to interact with the television system 10 in order to fully integrate the new feature. For example, after the feature has been downloaded into the consumer's VCR, a different mailbox icon 120 or onscreen message may be used to alert the consumer that information is required to implement the ordered feature. Again, the consumer begins the interactive process when desired by pressing any of the special remote control buttons 102, 104 or 106. Microprocessor 62 in conjunction with OSD 64 provides the necessary information on television screen 110 by using generated buttons 112, 114 and 116. These buttons solicit the required information from the consumer. The consumer responds to the various questions on television screen 110 by pressing the corresponding remote buttons 102, 104 and 106. For example, the placement and/or size of a second picture in a picture-in-picture display may need to be selected by the consumer for a picture-in-picture enhancement-type feature. Additionally, when data is downloaded to provide the consumer with a new feature (or features): (1) the new feature can be displayed almost immediately automatically, (2) the data or the new feature can be temporarily stored until the consumer requests the display of the feature, and (3) the data for multiple new features can be stored so that a group of features is later displayed at one time. If desired, consumers can select between these modes of displaying new features with remote control 100 and prompts 130 on television screen 110.

In the preferred embodiment, a telephone key pad at the consumer's location is used to order a desired feature. For example, an automated call response system may be utilized in conjunction with a touch tone keypad to receive the consumer's credit card number, consumer's identification number and the desired feature number such that the ordering can be done automatically. In an alternative embodiment, a two-way/interactive set-top box at the consumer's location is used to order the desired features with remote control 100. If this set-top box is a cable box, the cable company can then transmit the order to main location 20, and the cable company can also assist in the billing process. When ordering, the consumer's identification number may be needed so that the feature can later be saved in the correct consumer television system. This identification number is not needed in the interactive set-top box systems which can track an ordering consumer's location.

In another embodiment of the present invention, receiving location 48 is a computer, and information from an off-site database can be ordered for downloading into computer 48. For example, a particular article, news story, etc. may be advertised on an on-screen display. The customer could then order that particular article, news story, etc. for downloading into computer 48. Additionally, if desired, the consumer could order advertised software programs for computer 48 from the off-site database. These articles, news stories, software programs, and the like are sent to receiving locations in the same manner as described above.

While a full and complete disclosure of the invention has been provided hereinabove, it will be obvious to those skilled in the art that various modifications and changes may be made.

What is claimed is:

1. A method for providing an upgradeable user equipment, comprising:
   receiving program guide software that includes data related to program listings;
   processing the program guide software to generate a display of the program guide that includes at least one of the program listings;
   receiving information identifying a list of features that are not currently implemented in the program guide software;
   responsive to receiving the information, automatically generating for display an indication of the identified list of features that are not currently implemented in the program guide software;
   receiving a user selection of at least one feature of the identified list of features; and
   modifying the program guide software with additional program guide software associated with the at least one feature selected by a user to implement the at least one feature selected by the user.

2. The method of claim 1, wherein the additional program guide software is downloaded from a distribution location in response to the user selection of the at least one feature.

3. The method of claim 1, further comprising providing information regarding the at least one feature to the user.

4. The method of claim 3, wherein the information regarding the at least one feature is displayed in the form of an advertisement.

5. The method of claim 4, wherein the advertisement includes on-screen prompts which enable a user to interactively order the feature.

6. The method of claim 3, wherein the information regarding the at least one feature is provided to a plurality of users.

7. The method of claim 1, wherein the at least one feature is at least one of picture-in-picture enhancements, channel identification in a picture-in-picture screen, the display of graphic network logos and icons with channel identification, extended data service enhancements, stock quotation services, virtual channel services, news services, weather services, and sports score services.

8. The method of claim 1, wherein the user selects the at least one feature by ordering the feature via a telephone.

9. The method of claim 1, wherein receiving information identifying a list of features that are not currently implemented in the program guide software further comprises:
receiving an additional indication from an external source of at least one additional feature of the list of features that is not currently implemented in the program guide software; and
in response to receiving the additional indication, automatically displaying the additional indication.

10. The method of claim 1, wherein the indication of the identified list of features is displayed after data is stored for at least two features that are not currently implemented in the program guide software.

11. An upgradeable user equipment, comprising a processor configured to:
receive a program guide software that includes data related to program listings from a distribution location;
process the program guide software to generate a display of the program guide that includes at least one of the program listings;
receive information identifying a list of features that are not currently implemented in the program guide software;
responsive to receiving the information, automatically generate for display an indication of the identified list of features that are not currently implemented in the program guide software;
receive a user selection of at least one feature of the identified list of features; and
modify the program guide software with additional program guide software associated with the at least one feature selected by a user to implement the at least one feature selected by the user.

12. The system of claim 11, wherein the additional program guide software is downloaded from a distribution location in response to the user selection of the at least one feature.

13. The system of claim 11, wherein the processor is further configured to display information regarding the at least one feature to the user.

14. The system of claim 13, wherein the information regarding the at least one feature is displayed in the form of an advertisement.

15. The system of claim 14, wherein the advertisement includes on-screen prompts which enable a user to interactively order the feature.

16. The system of claim 13, wherein the information regarding the at least one feature is provided to a single user or to a plurality of users.

17. The system of claim 11, wherein the at least one feature is at least one of picture-in-picture enhancements, channel identification in a picture-in-picture screen, a display of graphic network logos and icons with channel identification, extended data service enhancements, stock quotation services, virtual channel services, news services, weather services, and sports score services.

18. The system of claim 11, wherein the user selects the feature by ordering the feature via a telephone.

19. The system of claim 11, wherein the indication of the identified list of features is displayed after data is stored for at least two features that are not currently implemented in the program guide software.

* * * * *